(12) United States Patent
Miyasaka

(10) Patent No.: US 10,099,364 B2
(45) Date of Patent: Oct. 16, 2018

(54) ROBOT

(71) Applicant: Seiko Epson Corporation, Tokyo (JP)

(72) Inventor: Hidekatsu Miyasaka, Matsumoto (JP)

(73) Assignee: Seiko Epson Corporation (JP)

( * ) Notice: Subject to any disclaimer, the term of this patent is extended or adjusted under 35 U.S.C. 154(b) by 227 days.

(21) Appl. No.: 15/137,235

(22) Filed: Apr. 25, 2016

(65) Prior Publication Data

US 2016/0318180 A1 Nov. 3, 2016

(30) Foreign Application Priority Data

Apr. 28, 2015 (JP) ................................. 2015-091213
Apr. 28, 2015 (JP) ................................. 2015-091214

(51) Int. Cl.
*B25J 9/04* (2006.01)
*B25J 9/00* (2006.01)

(52) U.S. Cl.
CPC ............. *B25J 9/0018* (2013.01); *B25J 9/047* (2013.01)

(58) Field of Classification Search
CPC ... B25J 9/045; B25J 9/046; B25J 9/047; B25J 17/025; B25J 21/005; B25J 9/0018

USPC .................... 414/732, 735, 738, 739, 740
See application file for complete search history.

(56) References Cited

U.S. PATENT DOCUMENTS 9,037,293 B2  5/2015 Gomi et al.
2003/0221504 A1* 12/2003 Stoianovici ............... B25J 9/06
  74/490.04

FOREIGN PATENT DOCUMENTS

JP        2014-046401 A    3/2014

\* cited by examiner

*Primary Examiner* — Saul Rodriguez
*Assistant Examiner* — Brendan P Tighe
(74) *Attorney, Agent, or Firm* — Harness, Dickey & Pierce, P.L.C.

(57) ABSTRACT

A robot includes: a base; a first arm provided on the base rotatably about a first rotation axis; and a second arm provided on the first arm rotatably about a second rotation axis that is a different axial direction from an axial direction of the first rotation axis. The first arm and the second arm can overlap with each other, as viewed from the axial direction of the second rotation axis. The first arm is bent.

5 Claims, 27 Drawing Sheets

ROBOT

BACKGROUND

1. Technical Field

The present invention relates to a robot.

2. Related Art

According to the related art, a robot having a robot arm is known. The robot arm has a plurality of arms (arm members) connected together via joint parts, and an end effector, for example, a hand, is installed on the arm on the most distal end side (most downstream side). The joint parts are driven by a motor. As the joint parts are driven, the arms rotate. The robot thus grasps an object with the hand, for example, then moves the object to a predetermined place, and carries out predetermined work such as assembly.

As such a robot, JP-A-2014-46401 discloses a vertical multi-joint robot. In the robot disclosed in JP-A-2014-46401, an operation of moving the hand to a position that is 180 degrees different about a first rotation axis, which is a rotation axis on the most proximal end side (most upstream side) (rotation axis extending in a vertical direction), in relation to the base, is carried out by rotating a first arm, which is an arm on the most proximal end side, about the first rotation axis in relation to the base.

The robot disclosed in JP-A-2014-46401 needs a large space to prevent interference of the robot when moving the hand to a position that is 180 degrees different about the first rotation axis in relation to the base.

SUMMARY

An advantage of some aspects of the invention is that a robot is provided in which an operation of moving the position of the distal end part of the robot to a position that is 180 degrees different about the first rotation axis can be achieved even when the space to prevent interference of the robot is small.

The invention can be implemented as the following forms or application examples.

Application Example 1

A robot according to this application example of the invention includes: a base; a first arm provided on the base rotatably about a first rotation axis; and a second arm provided on the first arm rotatably about a second rotation axis that is a different axial direction from an axial direction of the first rotation axis. The first arm and the second arm can overlap with each other, as viewed from the axial direction of the second rotation axis. The first arm is bent.

With this configuration, the space to prevent interference of the robot when moving the distal end of the second arm to a position that is 180 degrees different about the first rotation axis can be reduced.

Application Example 2

In the robot according to the application example of the invention, it is preferable that the first arm has: a first part provided on the base and extending in a first direction; a second part provided on the second arm and extending in a second direction that is different from the first direction; and a third part situated between the first part and the second part and extending in a direction that is different from the first direction and the second direction.

With this configuration, the rigidity of the first arm can be increased and the operation of the robot can be stabilized.

Application Example 3

In the robot according to the application example of the invention, it is preferable that the first arm has: a first part provided on the base and extending in a first direction; a second part provided on the second arm and extending in a second direction that is different from the first direction; and a third part situated between the first part and the second part and bent as viewed from a direction orthogonal to the first direction and the second direction.

With this configuration, the rigidity of the first arm can be increased and the operation of the robot can be stabilized.

Application Example 4

It is preferable that the robot according to the application example of the invention includes: a first drive unit which drives the first arm and is mounted on a first mounting surface of the first arm and on the base; and a second drive unit which drives the second arm and is mounted on a second mounting surface of the first arm and on the second arm, and that a maximum distance between a first straight line connecting a first point of intersection between the first rotation axis and the first mounting surface and a second point of intersection between the second rotation axis and the second mounting surface, and the third part, is shorter than a distance between the first straight line and a third point of intersection which is a point of intersection between a second straight line passing through the first point of intersection and extending in the first direction and a third straight line passing through the second point of intersection and extending in the second direction.

With this configuration, the rigidity of the first arm can be increased and the operation of the robot can be stabilized.

Application Example 5

In the robot according to the application example of the invention, it is preferable that a length of the second part in the axial direction of the second rotation axis is shorter than a length of the first part in the axial direction of the first rotation axis, as viewed from a direction orthogonal to the first direction and the second direction.

With this configuration, while a high rigidity of the first arm can be maintained, the weight of the first arm can be reduced and a reduction in weight of the robot can be achieved.

Application Example 6

A robot according to this application example of the invention includes: a base; a first arm provided on the base rotatably about a first rotation axis; a second arm provided on the first arm rotatably about a second rotation axis that is a different axial direction from an axial direction of the first rotation axis; a first drive unit which is provided on a first mounting surface of the first arm and drives the first arm; and a second drive unit which is provided on a second mounting surface of the first arm and drives the second arm. The first arm has a first part which can overlap with the second arm, as viewed from the axial direction of the second rotation axis. At least one of a wire and a pipe is arranged on first arm, more toward the second arm than the second mounting surface.

With this configuration, the space to prevent interference of the robot when moving the distal end of the second arm to a position that is 180 degrees different about the first rotation axis can be reduced.

Also, since at least one of a wire and a pipe is arranged more toward the second arm than the second mounting surface, the total width W1 of the first arm and the second arm (see FIG. 21) can be reduced and a reduction in size and weight of the robot can be achieved.

Application Example 7

In the robot according to the application example of the invention, it is preferable that at least one of the wire and the pipe is arranged inside the first arm.

With this configuration, the total width W1 of the first arm and the second arm (see FIG. 21) can be reduced and a reduction in size and weight of the robot can be achieved.

Application Example 8

It is preferable that the robot according to the application example of the invention has a regulating part which is provided on the first arm and regulates at least one of the wire and the pipe more toward the second arm than the second mounting surface.

With this configuration, at least one of the wire and the pipe can be easily arranged more toward the second arm than the second mounting surface.

Application Example 9

In the robot according to the application example of the invention, it is preferable that the first arm has a wall part including the first mounting surface and the second mounting surface, that the regulating part is a hole part formed in the wall part, and that at least one of the wire and the pipe is inserted through the hole part.

With this configuration, at least one of the wire and the pipe can be easily arranged more toward the second arm than the second mounting surface.

Application Example 10

In the robot according to the application example of the invention, it is preferable that at least one of the wire and the pipe is arranged, being folded in a circumferential direction of an output axis of the second drive unit, in the second drive unit.

With this configuration, the wire and the pipe can be restrained from being twisted or fractured when the robot is driven. Therefore, damage to the wire and the pipe can be restrained and durability can be improved.

Application Example 11

In the robot according to the application example of the invention, it is preferable that the first arm has a main body part having an opening, and a cover part which covers at least a part of the opening and is attachable/removable, and that when the first part and the second arm overlap with each other as viewed from the axial direction of the second rotation axis, at least a part of the cover part is situated between the main body part and the second arm.

Since the cover part is provided, accessibility to the inside of the first arm is improved and various kinds of work such as inspection, repair, and replacement can be easily carried out on each part such as the wire, the pipe, and the substrate arranged inside the first arm.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot according to the invention will be described in detail on the basis of preferred embodiments shown in the accompanying drawings.

First Embodiment

Figure 1:
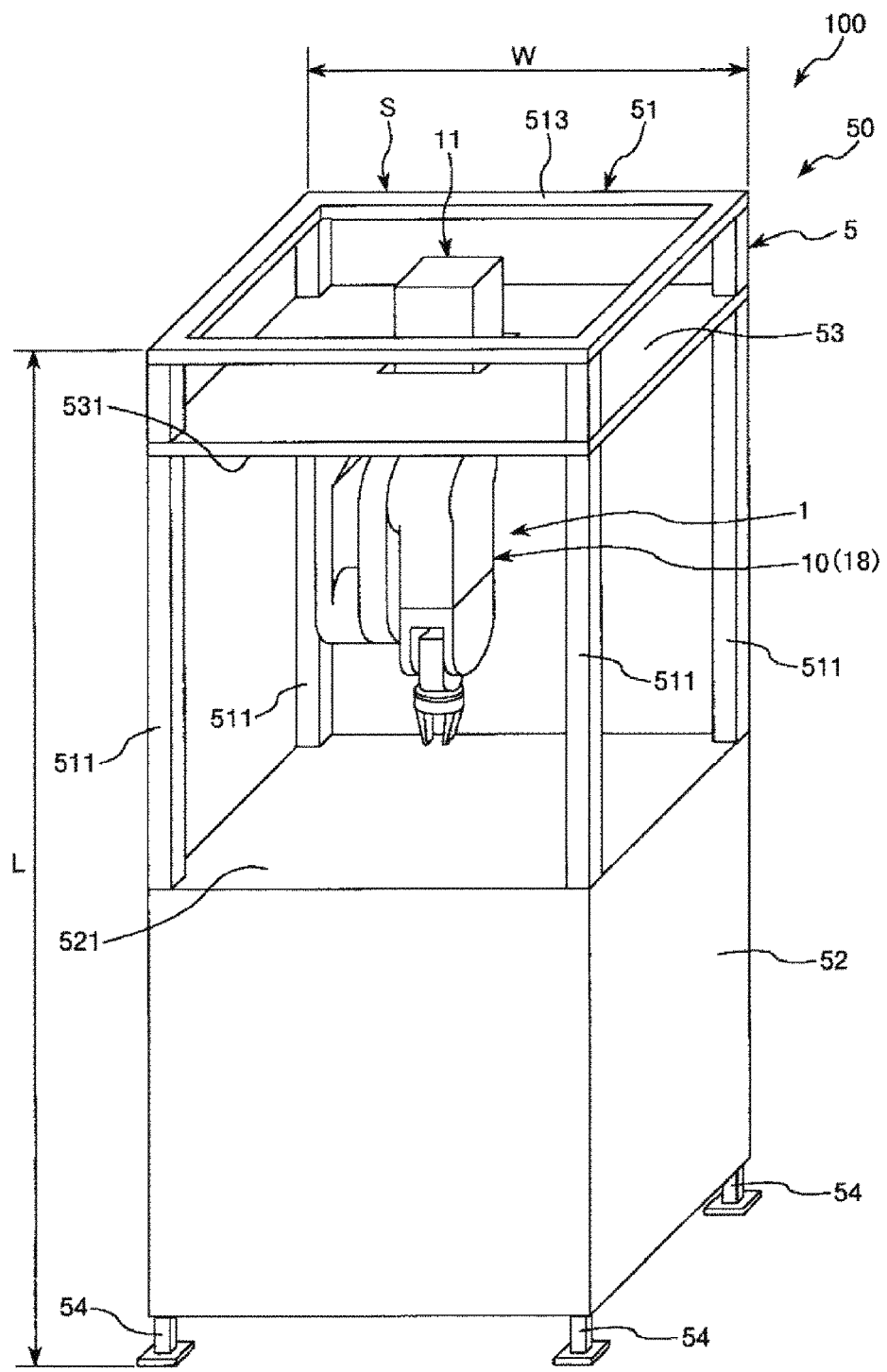
FIG. 1 is a perspective view showing a robot system having first and sixth embodiments of a robot according to the invention.
Figure 2:
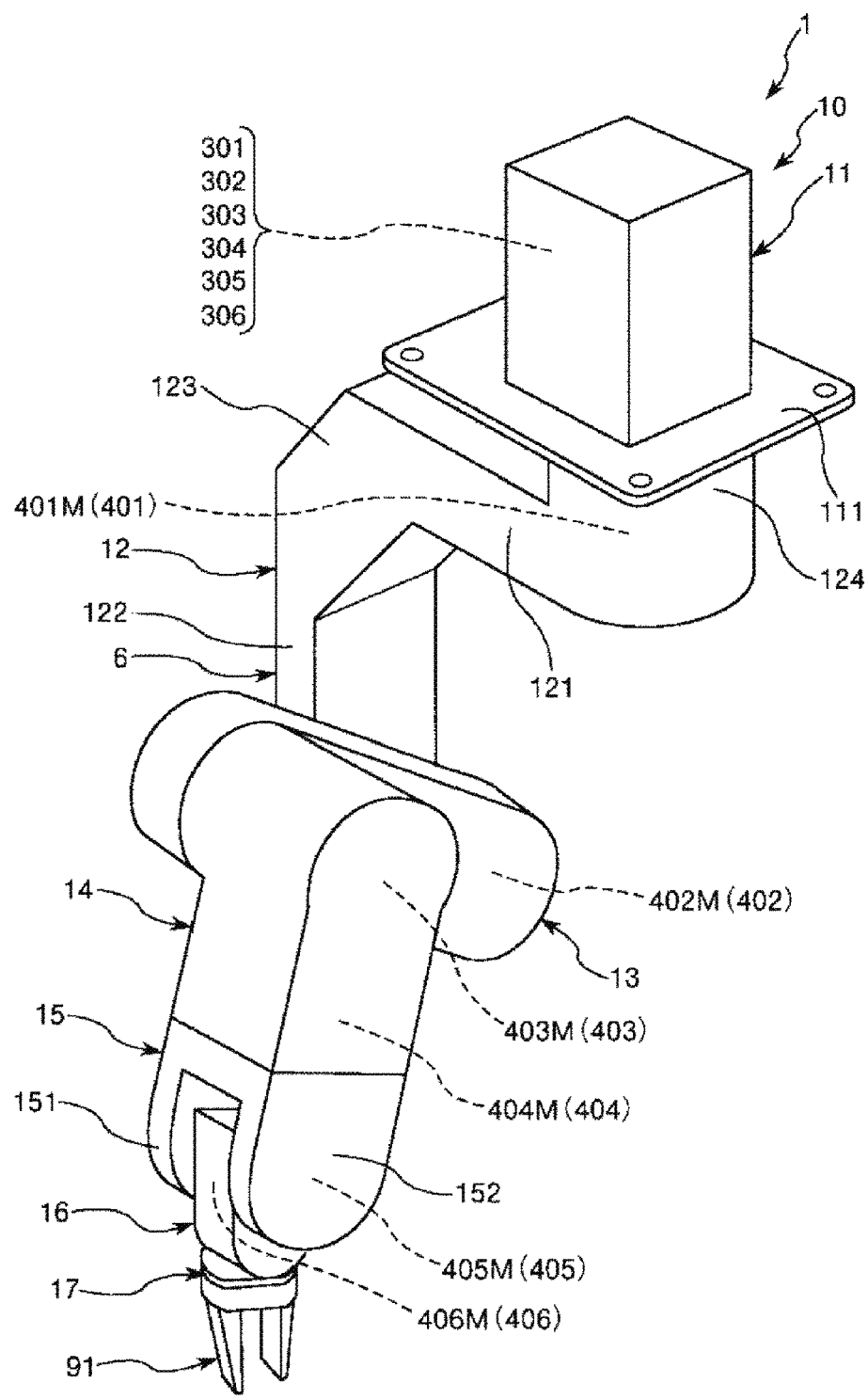
FIG. 2 is a perspective view showing a robot in the robot system shown in FIG. 1.
Figure 3:
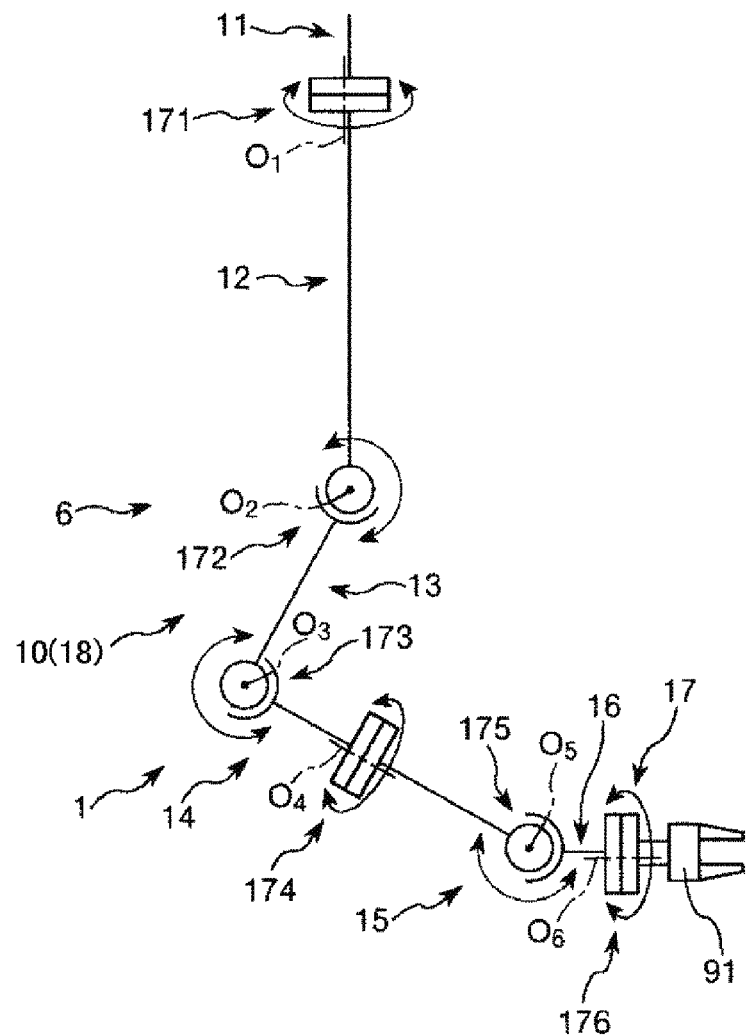
FIG. 3 is a schematic view showing the robot in the robot system shown in FIG. 1.
Figure 4:
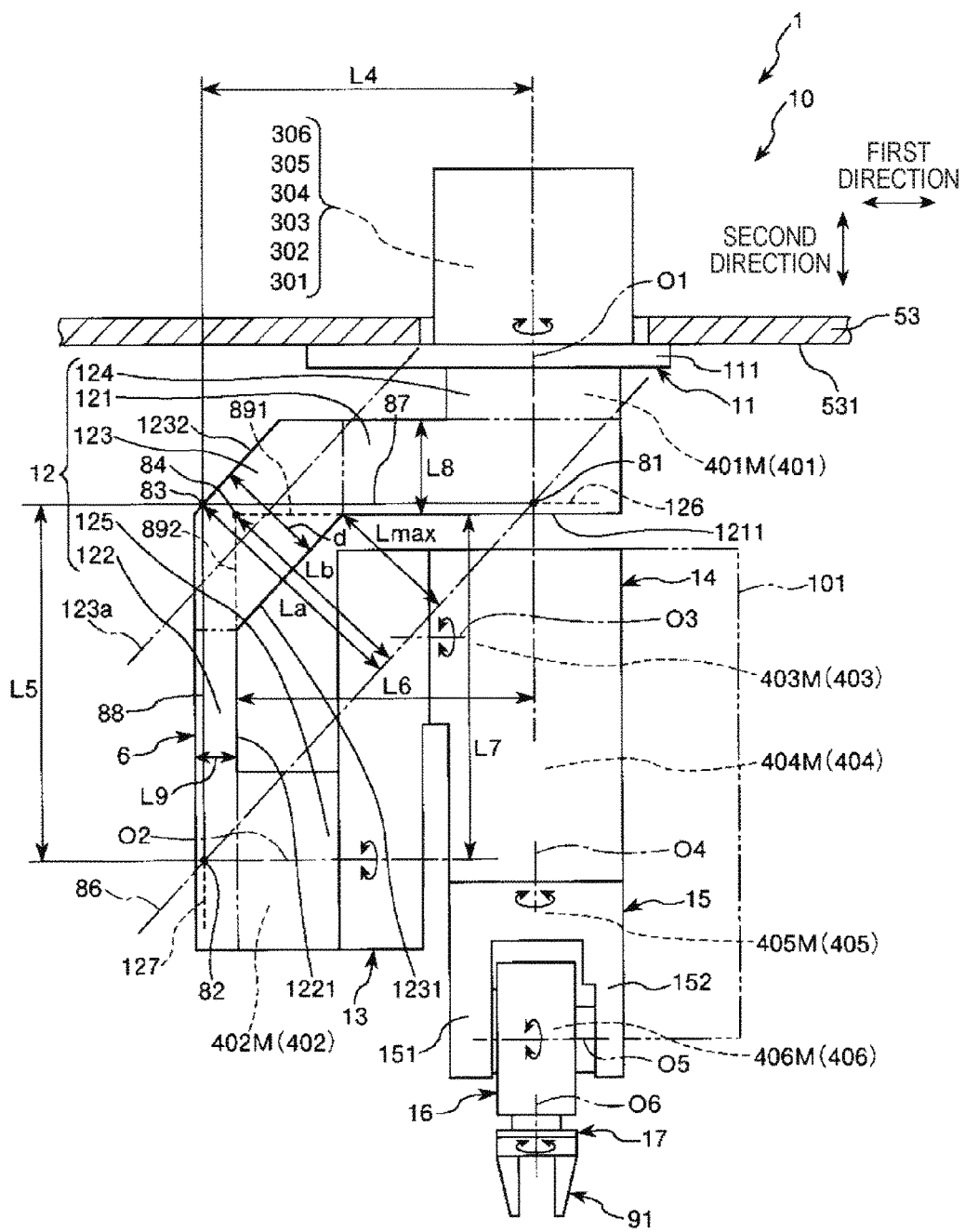
FIG. 4 shows the robot in a front view of the robot system shown in FIG. 1.
Figure 5:
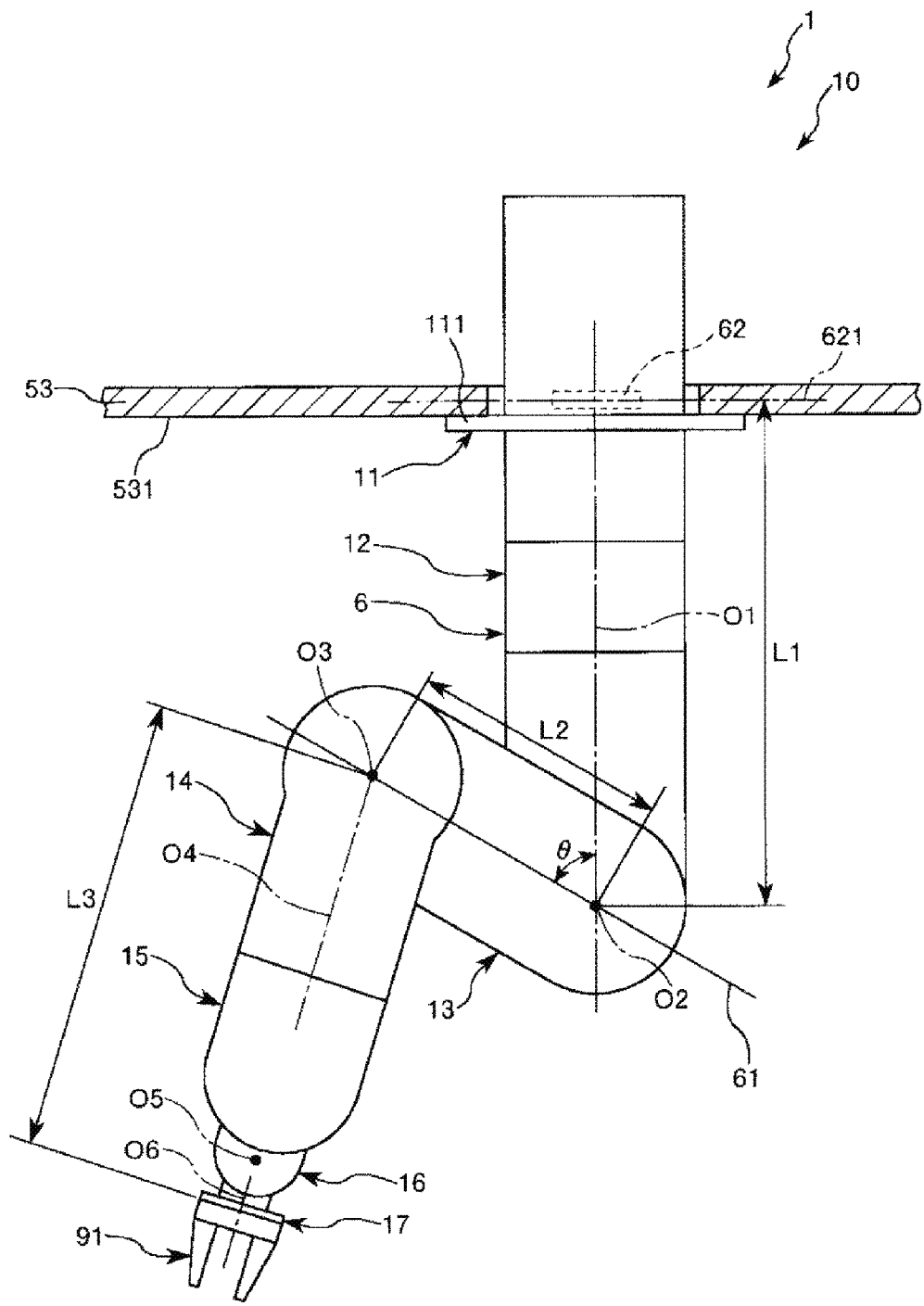
FIG. 5 shows the robot in a side view of the robot system shown in FIG. 1.
Figure 6:
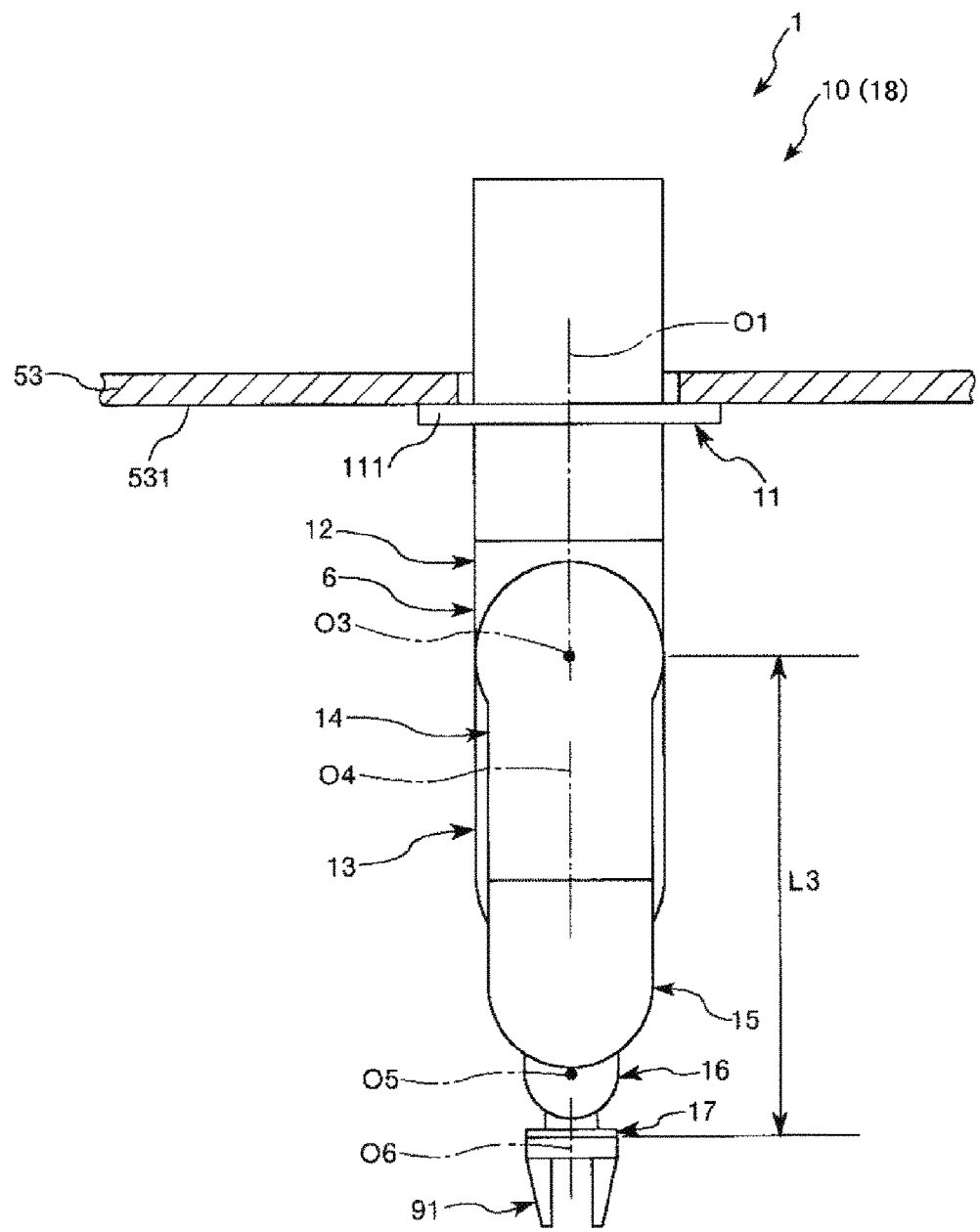
FIG. 6 shows the robot in a side view of the robot system shown in FIG. 1.
Figure 7:
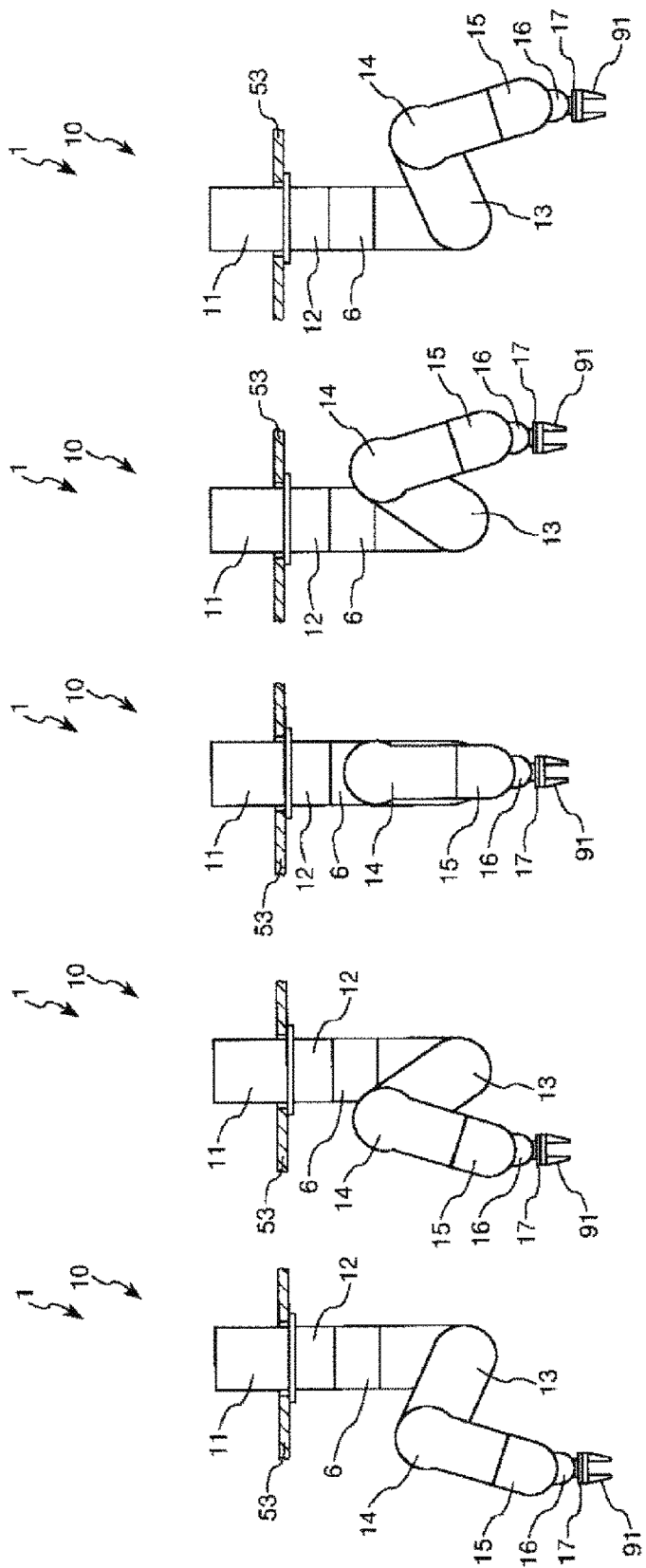
FIGS. 7A to 7E explain an operation when the robot in the robot system shown in FIG. 1 carries out work.

FIG. 1 is a perspective view showing a robot system having a first embodiment of the robot according to the invention. FIG. 2 is a perspective view showing the robot in the robot system shown in FIG. 1. FIG. 3 is a schematic view showing the robot in the robot system shown in FIG. 1. FIG. 4 shows the robot in a front view of the robot system shown in FIG. 1. FIGS. 5 and 6 each show the robot in a side view of the robot system shown in FIG. 1. That is, the robot shown in FIGS. 5 and 6 is the robot shown in FIG. 4 as viewed from the right in FIG. 4. FIGS. 7A to 7E explain an operation when the robot in the robot system shown in FIG. 1 carries out work.

In the description below, as a matter of convenience of explanation, the top side in FIGS. 1, 4 to 7E is referred to as "top" or "upper part", and the bottom side is referred to as "bottom" or "lower part". The base side in FIGS. 1 to 7E is referred to as "proximal end" or "upstream", and the opposite side (hand side) is referred to as "distal end" or "downstream". The up-down direction in FIGS. 1, 4 to 7E is the vertical direction. In FIG. 2, the robot is shown in the state of not being installed inside the cell.

A robot system 100 shown in FIG. 1 has a robot cell 50 including a cell 5 and a robot (industrial robot) 1 provided inside the cell 5. The robot 1 has a robot main body (main body part) 10 and a robot controller (control unit), not shown, for controlling the working of the robot main body 10 (robot 1).

The robot system 100 can be used, for example, in a manufacturing process for manufacturing a precision device such as a wristwatch. The robot 1 can, for example, carry out work such as feeding, removing, carrying and assembling the precision device and components forming the precision device.

The robot controller may be arranged inside the cell 5 or may be arranged outside the cell 5. If the robot controller is arranged inside the cell 5, the robot controller may be included inside the robot main body 10 (robot 1) or may be a separate unit from the robot main body 10. The robot controller may be made up of, for example, a personal computer (PC) with a built-in central processing unit (CPU), or the like.

Cell

As shown in FIG. 1, the cell 5 is a member which surrounds (accommodates) the robot 1, and can be easily relocated. Inside the cell 5, the robot 1 mainly carries out work such as assembly.

The cell 5 has four foot parts 54 which allow the entirety of the cell 5 to be installed, for example, in an installation space such as a floor, a frame part 51 supported by the four foot parts 54, a work table (table part) 52 provided in a lower part of the frame part 51, and a ceiling part 53 provided in an upper part of the frame part 51. The outer shape of the cell 5, when viewed from the vertical direction, is square in this embodiment, though it is not particularly limited. The outer shape may also be rectangular or the like, for example.

The frame part 51 has four support posts 511 extending in the vertical direction (up-down direction in FIG. 1), and a frame-like top part 513 provided at the top end of the four support posts 511.

The work table 52, in this embodiment, is in the shape of a rectangular parallelepiped and has a quadrilateral (rectangular) plate on each of its six faces. The work table 52 has its four corners supported by the four support posts 511 of the frame part 51, as viewed from the vertical direction. The robot 1 can carry out each type of work on a work surface 521 of the work table 52.

The ceiling part 53 is a member which supports the robot 1, and in this embodiment, is in the shape of a quadrilateral (rectangular) plate. The ceiling part 53 has its four corners supported by the four support posts 511 of the frame part 51, as viewed from the vertical direction. A base 11 of the robot 1, described later, is fixed (supported) on a ceiling surface (first surface) 531 on the bottom side of the ceiling part 53. The ceiling surface 531 is a flat surface parallel to a horizontal plane.

Between the support posts 511 next to each other above the work table 52, that is, on the four lateral sides of the frame part 51 and the top part 513, a safety board (not shown) or the like may be installed in order to prevent the operator or foreign matters such as dust from entering into the frame part 51.

The cell 5 need not necessarily have the foot parts 54. In such a case, the work table 52 may be installed directly in the installation space.

Robot

As shown in FIGS. 2 to 4, the robot main body 10 has a base (support part) 11 and a robot arm 6. The robot arm 6 includes a first arm (first arm member) (arm part) 12, a second arm (second arm member) (arm part) 13, a third arm (third arm member) (arm part) 14, a fourth arm (fourth arm member) (arm part) 15, a fifth arm (fifth arm member) (arm part) 16 and a sixth arm (sixth arm member) (arm part) 17 (six arms), and a first drive source (first drive unit) 401, a second drive source (second drive unit) 402, a third drive source (third drive unit) 403, a fourth drive source (fourth drive unit) 404, a fifth drive source (fifth drive unit) 405 and a sixth drive source (sixth drive unit) 406 (six drive sources). The fifth arm 16 and the sixth arm 17 form a wrist. At the distal end of the sixth arm 17, for example, an end effector such as a hand 91 can be removably attached.

The robot 1 is a vertical multi-joint (six-axis) robot in which the base 11, the first arm 12, the second arm 13, the third arm 14, the fourth arm 15, the fifth arm 16 and the sixth arm 17 are connected in this order from the proximal end side toward the distal end side. Hereinafter, each of the first arm 12, the second arm 13, the third arm 14, the fourth arm 15, the fifth arm 16 and the sixth arm 17 is also referred to as the "arm". Each of the first drive source 401, the second drive source 402, the third drive source 403, the fourth drive source 404, the fifth drive source 405 and the sixth drive source 406 is also referred to as the "drive source (drive unit)".

As shown in FIGS. 1 and 4, the base 11 is a portion fixed to (member mounted on) the ceiling surface 531 of the ceiling part 53 of the cell 5. The fixing method for this is not particularly limited. For example, a fixing method using a plurality of bolts or the like can be employed.

In this embodiment, a plate-like flange 111 provided at a distal end part of the base 11 is mounted on the ceiling surface 531. However, the site of the base 11 mounted on the ceiling surface 531 is not limited to this example. For instance, a proximal end surface of the base 11 (en surface on the top side in FIG. 4) may be used.

Here, in this robot 1, the connection part between the base 11 and the robot arm 6, that is, the center of a bearing part 62 (see FIG. 5), described later, is situated above the ceiling surface 531 in the vertical direction. The center of the bearing part 62 is not limited to this position and may be situated, for example, below the ceiling surface 531 in the vertical direction or may be situated at the same position as the ceiling surface 531 in the vertical direction.

In the robot 1, since the base 11 is installed on the ceiling surface 531, the connection part between the first arm 12 and the second arm 13, that is, the center of a bearing part, not shown, for rotatably supporting the second arm 13, is situated below the center of the bearing part 62 in the vertical direction.

The base 11 may or may not include a joint 171, described later (see FIG. 3).

The first arm 12, the second arm 13, the third arm 14, the fourth arm 15, the fifth arm 16 and the sixth arm 17 are supported in such a way that each of these arms can be independently displaced in relation to the base 11.

As shown in FIGS. 2 and 4, the first arm 12 is bent (has a bent shape). The term "bent" is a concept including both being bent sharply and being curved. In the case of being bent sharply, the corner may be pointed or round. The first arm 12 will be described below, referring to the state of FIG. 4.

The first arm 12 has: a first extension part 124 connected to the base 11 and extending (stretching) downward in FIG. 4 in the axial direction of a first rotation axis O1 (vertical direction), described later, from the base 11; a first part 121 extending to the left in FIG. 4 in the axial direction of a second rotation axis O2 (horizontal direction), from the bottom end of the first extension part 124 in FIG. 4; an intermediate part 123 provided at the end of the first part 121 opposite to the first extension part 124; a second part 122 provided at the end of the intermediate part 123 opposite to the first part 121 and extending downward in FIG. 4 in the axial direction of the first rotation axis O1 (vertical direction); and a second extension part 125 extending to the right in FIG. 4 in the axial direction of the second rotation axis O2 (horizontal direction) from the end of the second part 122 opposite to the intermediate part 123.

Here, the axial direction of the second rotation axis O2 is a "first direction" and the axial direction of the first rotation axis O1 is a "second direction". Therefore, the first part 121 stretches (extends) in the first direction and the second part 122 stretches in the second direction. The first part 121 is provided indirectly to the base 11 via the first extension part 124. The second part 122 is provided indirectly to the second arm 13 via the second extension part 125.

The intermediate part 123 is situated between the first part 121 and the second part 122 and stretches in a third direction that is different from the first direction and the second direction.

That is, when an axis 123a parallel to the direction in which the intermediate part 123 stretches is assumed, this axis 123a intersects with both an axis (not shown) parallel to the direction in which the first part 121 stretches and an axis (not shown) parallel to the direction in which the second part 122 stretches, as viewed from a direction orthogonal to both the first rotation axis O1 and the second rotation axis O2 (direction perpendicular to the face of FIG. 4). In other words, the axis 123a is tilted by a predetermined angle in relation to an axis parallel to the direction in which the first part 121 stretches and an axis parallel to the direction in which the second part 122 stretches, as viewed from a direction orthogonal to both the first rotation axis O1 and the second rotation axis O2.

To explain further in detail, the surface of a third part 1231, which is apart on the inner side (bottom right-hand side in FIG. 4) of the intermediate part 123, and the surface of a part 1232 on the outer side (top left-hand side in FIG. 4) are each flat surfaces and these surfaces stretch in the third direction, as viewed from a direction orthogonal to both the first rotation axis O1 and the second rotation axis O2. The directions in which the two surfaces stretch are the same in the illustrated configuration, as viewed from a direction orthogonal to both the first rotation axis O1 and the second rotation axis O2. However, these directions may be different from each other.

A surface 1211 of a part on the inner side (bottom side in FIG. 4) of the first part 121 and a surface 1221 of a part on the inner side (right side in FIG. 4) of the second part 122 are each flat surfaces. The surface of the third part 1231 intersects with both the surface 1211 of the part on the inner side of the first part 121 and the surface 1221 of the part on the inner side of the second part 122, as viewed from a direction orthogonal to both the first rotation axis O1 and the second rotation axis O2. In other words, the surface of the third part 1231 is tilted by a predetermined angle in relation to both the surface 1211 of the part on the inner side of the first part 121 and the surface 1221 of the part on the inner side of the second part 122, as viewed from a direction orthogonal to both the first rotation axis O1 and the second rotation axis O2.

Of the first arm 12, a part that has the greatest influence on the rigidity of the first arm 12 is the intermediate part 123. The above configuration enables a reduction in maximum distance Lmax, described later, and an increase in the thickness d of the intermediate part 123. Thus, the rigidity of the first arm 12 can be increased and the operation of the robot 1 can be stabilized.

Since the above configuration enables an increase in the rigidity of the first arm 12, a high rigidity of the first arm 12 can be maintained even when the thickness of the second part 122, that is, the length L9 of the second part 122 in the axial direction of the second rotation axis O2, is decreased. As the length L9 of the second part 122 is decreased, the weight of the first arm 12 can be reduced. That is, while a high rigidity of the first arm 12 is maintained, the weight of the arm 12 can be reduced and therefore a reduction in weight of the robot 1 can be achieved.

The first part 121, the second part 122, the intermediate part 123, the first extension part 124 and the second extension part 125 are integrally formed. The first part 121 and the second part 122 are substantially orthogonal to (intersecting with) each other, as viewed from a direction orthogonal to both the first rotation axis O1 and the second rotation axis O2.

The second arm 13 has a longitudinal shape and is connected to a distal end part of the first arm 12, that is, the end of the second extension part 125 opposite to the second part 122.

The third arm 14 has a longitudinal shape and is connected to a distal end part of the second arm 13, that is, the end of the second arm 13 opposite to its end connected to the first arm 12.

The fourth arm 15 is connected to a distal end part of the third arm 14, that is, the end of the third arm 14 opposite to its end connected to the second arm 13. The fourth arm 15 has a pair of support parts 151, 152 facing each other. The support parts 151, 152 are used to connect the fourth arm 15 to the fifth arm 16.

The fifth arm 16 is situated between and connected to the support parts 151, 152 and thus connected to the fourth arm 15. The fourth arm 15 is not limited to this structure and may have, for example, one support part (cantilever).

The sixth arm 17 is in the shape of a flat plate and is connected to a proximal end part of the fifth arm 16. At a distal end part of the sixth arm 17 (end opposite to the fifth arm 16), the hand 91 to grasp, for example, a precision device such as a wristwatch, or a component or the like, is removably installed as an end effector. The driving of the hand 91 is controlled by the robot controller. The hand 91 is not particularly limited and may be, for example, a structure having a plurality of finger parts (fingers). By controlling the operations of the arms 12 to 17 and the like while causing the hand 91 to grasp a precision device, component or the like, the robot 1 can carry out each type of work such as carrying the precision device or component.

As shown in FIGS. 2 to 4, the base 11 and the first arm 12 are connected together via the joint 171. The joint 171 has a mechanism for supporting the first arm 12 connected to the base 11, rotatably in relation to the base 11. This enables the first arm 12 to rotate about the first rotation axis O1 (around the first rotation axis O1) parallel to the vertical direction, in relation to the base 11. The first rotation axis O1 coincides with a normal line to the ceiling surface 531 of the ceiling part 53 on which the base 11 is mounted. The first rotation axis O1 is a rotation axis situated on the most upstream side of the robot 1. The rotation around the first rotation axis O1 (driving of the first arm 12) is carried out by the driving of the first drive source 401, which has a motor (first motor) 401M and a decelerator (not shown) and is mounted on a first mounting surface 126 (see FIG. 4) of the first arm 12 and a mounting surface of the base 11 or the like. The first drive source 401 is driven by the motor 401M and a cable (not shown). The motor 401M is controlled by the robot controller via a motor driver 301 electrically connected to the motor 401M. The decelerator may be omitted.

In this embodiment, the first arm 12 is not provided with a brake (braking device) for braking the first arm 12. However, this is not limiting and a brake (not shown) such as an electromagnetic brake may be provided near the axial part of the motor 401M, as a brake for braking the first arm 12, similarly to the other arms.

The first arm 12 and the second arm 13 are connected together via a joint 172. The joint 172 has a mechanism for supporting one of the first arm 12 and the second arm 13 connected to each other, rotatably in relation to the other. This enables the second arm 13 to rotate about the second rotation axis O2 (around the second rotation axis O2) parallel to the horizontal direction, in relation to the first arm 12. The second rotation axis O2 is orthogonal to the first rotation axis O1. The rotation around the second rotation axis O2 (driving of the second arm 13) is carried out by the driving of the second drive source 402, which has a motor (second motor) 402M and a decelerator (not shown) and is mounted on a mounting surface of the second arm 13 and a second mounting surface 127 of the first arm 12 (see FIG. 4) or the like. The second drive source 402 is driven by the motor 402M and a cable (not shown). The motor 402M is controlled by the robot controller via a motor driver 302 electrically connected to the motor 402M. The decelerator may be omitted.

As a brake (braking device) for braking the second arm 13, a brake (not shown) is provided near the axis part of the motor 402M. This brake can prevent the axis part of the motor 402M from rotating and thus enables the attitude of the second arm 13 to be held.

The second rotation axis O2 may be parallel to an axis orthogonal to the first rotation axis O1. Alternatively, the second rotation axis O2 may have a different axial direction from the first rotation axis O1, even if it is not orthogonal to the first rotation axis O1.

The second arm 13 and the third arm 14 are connected together via a joint 173. The joint 173 has a mechanism for supporting one of the second arm 13 and the third arm 14 connected to each other, rotatably in relation to the other. This enables the third arm 14 to rotate about a third rotation axis O3 (around the third rotation axis O3) parallel to the horizontal direction, in relation to the second arm 13. The third rotation axis O3 is parallel to the second rotation axis O2. The rotation around the third rotation axis O3 (driving of the third arm 14) is carried out by the driving of the third drive source 403, which has a motor (third motor) 403M and a decelerator (not shown) and is mounted on a mounting surface of the third arm 14 and a mounting surface of the second arm 13 or the like. The third drive source 403 is driven by the motor 403M and a cable (not shown). The motor 403M is controlled by the robot controller via a motor driver 303 electrically connected to the motor 403M. The decelerator may be omitted.

As a brake (braking device) for braking the third arm 14, a brake (not shown) is provided near the axis part of the motor 403M. This brake can prevent the axis part of the motor 403M from rotating and thus enables the attitude of the third arm 14 to be held.

The third arm 14 and the fourth arm 15 are connected together via a joint 174. The joint 174 has a mechanism for supporting one of the third arm 14 and the fourth arm 15 connected to each other, rotatably in relation to the other. This enables the fourth arm 15 to rotate about a fourth rotation axis O4 (around the fourth rotation axis O4) parallel to the direction of the center axis of the third arm 14, in relation to the third arm 14 (base 11). The fourth rotation axis O4 is orthogonal to the third rotation axis O3. The rotation around the fourth rotation axis O4 (driving of the fourth arm 15) is carried out by the driving of the fourth drive source 404, which has a motor (fourth motor) 404M and a decelerator (not shown) and is mounted on a mounting surface of the fourth arm 15 and a mounting surface of the third arm 14 or the like. The fourth drive source 404 is driven by the motor 404M and a cable (not shown). The motor 404M is controlled by the robot controller via a motor driver 304 electrically connected to the motor 404M. The decelerator may be omitted.

As a brake (braking device) for braking the fourth arm 15, a brake (not shown) is provided near the axis part of the motor 404M. This brake can prevent the axis part of the motor 404M from rotating and thus enables the attitude of the fourth arm 15 to be held.

The fourth rotation axis O4 may be parallel to an axis orthogonal to the third rotation axis O3. Alternatively, the fourth rotation axis O4 may have a different axial direction from the third rotation axis O3, even if it is not orthogonal to the third rotation axis O3.

The fourth arm 15 and the fifth arm 16 are connected together via a joint 175. The joint 175 has a mechanism for supporting one of the fourth arm 15 and the fifth arm 16 connected to each other, rotatably in relation to the other. This enables the fifth arm 16 to rotate about a fifth rotation axis O5 (around the fifth rotation axis O5) orthogonal to the direction of the center axis of the fourth arm 15, in relation to the fourth arm 15. The fifth rotation axis O5 is orthogonal to the fourth rotation axis O4. The rotation around the fifth rotation axis O5 (driving of the fifth arm 16) is carried out by the driving of the fifth drive source 405 mounted on a mounting surface of the fifth arm 16 and a mounting surface of the fourth arm 15 or the like. The fifth drive source 405 has a motor (fifth motor) 405M, a decelerator (not shown), a first pulley (not shown) connected to the axis part of the motor 405M, a second pulley (not shown) spaced apart from the first pulley and connected to the axis part of the decelerator, and a belt (not shown) laid over the first pulley and the second pulley. The fifth drive source 405 is driven by the motor 405M and a cable (not shown). The motor 405M is controlled by the robot controller via a motor driver 305 electrically connected to the motor 405M. The decelerator may be omitted.

As a brake (braking device) for braking the fifth arm 16, a brake (not shown) is provided near the axis part of the motor 405M. This brake can prevent the axis part of the motor 405M from rotating and thus enables the attitude of the fifth arm 16 to be held.

The fifth rotation axis O5 may be parallel to an axis orthogonal to the fourth rotation axis O4. Alternatively, the fifth rotation axis O5 may have a different axial direction from the fourth rotation axis O4, even if it is not orthogonal to the fourth rotation axis O4.

The fifth arm 16 and the sixth arm 17 are connected together via a joint 176. The joint 176 has a mechanism for supporting one of the fifth arm 16 and the sixth arm 17 connected to each other, rotatably in relation to the other. This enables the sixth arm 17 to rotate about a sixth rotation axis O6 (around the sixth rotation axis O6) in relation to the fifth arm 16. The sixth rotation axis O6 is orthogonal to the fifth rotation axis O5. The rotation around the sixth rotation axis O6 (driving of the sixth arm 17) is carried out by the driving of the sixth drive source 406, which has a motor (sixth motor) 406M and a decelerator (not shown) and is mounted on a mounting surface of the sixth arm 17 and a mounting surface of the fifth arm 16 or the like. The sixth drive source 406 is driven by the motor 406M and a cable (not shown). The motor 406M is controlled by the robot controller via a motor driver 306 electrically connected to the motor 406M. The decelerator may be omitted.

As a brake (braking device) for braking the sixth arm 17, a brake (not shown) is provided near the axis part of the motor 406M. This brake can prevent the axis part of the motor 406M from rotating and thus enables the attitude of the sixth arm 17 to be held.

The sixth rotation axis O6 may be parallel to an axis orthogonal to the fifth rotation axis O5. Alternatively, the sixth rotation axis O6 may have a different axial direction from the fifth rotation axis O5, even if it is not orthogonal to the fifth rotation axis O5.

The motors 401M to 406M are not particularly limited and may be, for example, servo motors such as AC servo motors or DC servo motors, and the like.

The respective brakes are not particularly limited and may be, for example, electromagnetic brakes, and the like.

The motor drivers 301 to 306 are arranged on the base in the illustrated configuration. However, this configuration is not limiting and the motor drivers 301 to 306 may be arranged, for example, in the robot controller.

Up to this point, the configuration of the robot 1 has been briefly described.

Next, the relations between the first arm 12 to the sixth arm 17 will be described, with different expressions and from various perspectives. The third arm 14 to the sixth arm 17 are considered to be in a straightened state, that is, in their longest states. In other words, these arms are considered to be in the state where the fourth rotation axis O4 and the sixth rotation axis O6 coincide with each other or parallel to each other.

First, as shown in FIG. 5, the length L1 of the first arm 12 is set to be longer than the length L2 of the second arm 13.

Here, the length L1 of the first arm 12 is the distance between the second rotation axis O2 and a centerline 621 extending in a left-right direction in FIG. 5 of the bearing part 62 rotatably supporting the first arm 12, as viewed from the axial direction of the second rotation axis O2.

The length L2 of the second arm 13 is the distance between the second rotation axis O2 and the third rotation axis O3, as viewed from the axial direction of the second rotation axis O2.

Also, the first arm 12 and the second arm 13 are configured in such a way that the angle θ formed by the first arm 12 and the second arm 13 can be made 0 degrees, as viewed from the axial direction of the second rotation axis O2, as shown in FIG. 6. That is, the first arm 12 and the second arm 13 are configured in such a way as to be able to overlap with each other, as viewed from the axial direction of the second rotation axis O2.

The second arm 13 is configured in such a way as not to interfere with the ceiling surface 531 of the ceiling part 53 where the base 11 is provided and the first part 121 and the third part 1231 of the first arm 12, when the angle θ is 0 degrees, that is, when the first arm 12 and the second arm 13 overlap with each other, as viewed from the axial direction of the second rotation axis O2. In the case where the proximal end surface of the base 11 is mounted on the ceiling surface 531, the second arm 13 is similarly configured in such a way as not to interfere with the ceiling surface 531 and the first part 121 and the third part 1231 of the first arm 12.

Here, the angle θ formed by the first arm 12 and the second arm 13 is the angle formed by a straight line passing through the second rotation axis O2 and the third rotation axis O3 (center axis of the second arm 13 as viewed from the axial direction of the second rotation axis O2) 61 and the first rotation axis O1, as viewed from the axial direction of the second rotation axis O2.

By rotating the second arm 13 without rotating the first arm. 12, it is possible to move the distal end of the second arm 13 to a position that is 180 degrees different around the first rotation axis O1, following the state where the angle θ is 0 degrees as viewed from the axial direction of the second rotation axis O2 (state where the first arm 12 and the second arm 13 overlap with each other) (see FIGS. 7A to 7E). That is, by rotating the second arm 13 without rotating the first arm 12, it is possible to move the distal end of the robot arm 6 (distal end of the sixth arm 17) from a first position shown in FIG. 7A to the state where the angle θ is 0 degrees, and then to a second position shown in FIG. 7E that is 180 degrees different around the first rotation axis O1 (see FIGS. 7A to 7E). The third arm 14 to the sixth arm 17 are each rotated according to need.

When the distal end of the second arm 13 is moved to a position that is 180 degrees different around the first rotation axis O1 (when the distal end of the robot arm 6 is moved from the first position to the second position), the distal end of the second arm 13 and the distal end of the robot arm 6 move on a straight line, as viewed from the axial direction of the first rotation axis O1.

The total length (maximum length) L3 of the third arm 14 to the sixth arm 17 is set to be longer than the length L2 of the second arm 13.

Thus, when the second arm 13 and the third arm 14 overlap with each other, as viewed from the axial direction of the second rotation axis O2, the distal end of the sixth arm 17 can be made to protrude from the second arm 13. Thus, the hand 91 can be prevented from interfering with the first arm 12 and the second arm 13.

Here, the total length (maximum length) L3 of the third arm 14 to the sixth arm 17 is the distance between the third rotation axis O3 and the distal end of the sixth arm 17, as viewed from the axial direction of the second rotation axis O2 (see FIG. 5). In this case, the third arm 14 to the sixth arm 17 are in the state where the fourth rotation axis O4 and the sixth rotation axis O6 coincide with each other or parallel to each other, as shown in FIG. 5.

The second arm 13 and the third arm 14 are configured in such a way as to be able to overlap with each other, as viewed from the axial direction of the second rotation axis O2, as shown in FIG. 6.

That is, the first arm 12, the second arm 13 and the third arm 14 are configured in such a way as to be able to overlap with each other simultaneously, as viewed from the axial direction of the second rotation axis O2.

When the above relations are satisfied, by rotating the second arm 13 and the third arm 14 without rotating the first arm 12, the robot 1 can move the hand 91 (distal end of the sixth arm 17) to a position that is 180 degrees different around the first rotation axis O1, following the state where the angle θ formed by the first arm 12 and the second arm 13 is 0 degrees as viewed from the axial direction of the second rotation axis O2 (state where the first arm 12 and the second arm 13 overlap with each other). Using this operation, the robot 1 can be driven efficiently, and the space provided to prevent interference of the robot 1 can be reduced. Also, various advantages can be achieved as described later.

Also, when a straight line connecting a first point of intersection 81 between the first rotation axis O1 and the first mounting surface 126 and a second point of intersection 82 between the second rotation axis O2 and the second mounting surface 127 is defined as a first straight line 86, a straight line passing through the first point of intersection 81 and stretching in the first direction (axial direction of the second rotation axis O2) is defined as a second straight line 87, a straight line passing through the second point of intersection 82 and stretching in the second direction (axial direction of the first rotation axis O1) is defined as a third straight line 88, and a point of intersection between the second straight line 87 and the third straight line 88 is defined as a third point of intersection 83, the maximum distance Lmax between the first straight line 86 and the intermediate part 123 (third part 1231) is shorter than the distance La between the first straight line 86 and the third point of intersection 83, as shown in FIG. 4.

When a point of intersection between a straight line 891 along the surface (side) 1211 of the part on the inner side of the first part 121 and a straight line 892 along the surface (side) 1221 of the part on the inner side of the second part 122 as viewed from a direction orthogonal to both the first rotation axis O1 and the second rotation axis O2 is defined as a fourth point of intersection 84, the maximum distance Lmax is shorter than the distance Lb between the first straight line 86 and the fourth point of intersection 84. In other words, the straight line 891 is a straight line formed by extending the surface 1211 of the part on the inner side of the first part 121, to the left in FIG. 4 in the first direction. The straight line 892 is a straight line formed by extending the surface 1221 of the part on the inner side of the second part 122, upward in FIG. 4 in the second direction.

In this way, in the robot 1, the maximum distance Lmax is short and the thickness d of the intermediate part 123 is thick. Thus, the rigidity of the first arm 12 can be increased and the operation of the robot 1 can be stabilized.

Also, since the rigidity of the first arm 12 can be increased with the above configuration, a high rigidity of the first arm 12 can be maintained even when the length L9 of the second part 122 in the axial direction of the second rotation axis O2 is decreased.

As viewed from a direction orthogonal to both the first rotation axis O1 and the second rotation axis O2, the length L9 of the second part 122 in the axial direction of the second rotation axis O2 is shorter than the length L8 of the first part 121 in the axial direction of the first rotation axis O1.

Thus, a reduction in weight of the first arm 12 can be achieved. That is, while a high rigidity of the first arm 12 is maintained, the weight of the first arm 12 can be reduced and therefore a reduction in weight of the robot 1 can be achieved.

L8 and L9 are not particularly limited and may be suitably set according to various conditions. However, L8 may be preferably 30 mm or longer and 120 mm or shorter, and more preferably 50 mm or longer and 80 mm or shorter. L9 may be preferably 10 mm or longer and 70 mm or shorter, and more preferably 20 mm or longer and 50 mm or shorter. Thus, a reduction in weight of the first arm 12 can be achieved.

The thickness d of the intermediate part 123 is not particularly limited and may be suitably set according to various conditions. However, the thickness d may be preferably 30 mm or more and 120 mm or less, more preferably 40 mm or more and 100 mm or less, and even more preferably 50 mm or more and 80 mm or less. Thus, the rigidity of the first arm 12 can be increased.

Lmax is not particularly limited and may be suitably set according to various conditions. However, Lmax may be preferably 40 mm or longer and 160 mm or shorter, more preferably 50 mm or longer and 120 mm or shorter, and even more preferably 60 mm or longer and 100 mm or shorter. Thus, the rigidity of the first arm 12 can be increased.

The distance (length) L4 from the first point of intersection 81 to the third point of intersection 83 as viewed from a direction orthogonal to both the first rotation axis O1 and the second rotation axis O2 is not particularly limited and may be suitably set according to various conditions. However, L4 may be preferably 100 mm or longer and 400 mm or shorter, and more preferably 150 mm or longer and 250 mm or shorter.

The distance (length) L5 from the third point of intersection 83 to the second point of intersection 82 as viewed from a direction orthogonal to both the first rotation axis O1 and the second rotation axis O2 is not particularly limited and may be suitably set according to various conditions. However, L5 may be preferably 120 mm or longer and 450 mm or shorter, and more preferably 180 mm or longer and 280 mm or shorter.

The distance (length) L6 from the first rotation axis O1 to the surface 1221 of the part on the inner side of the second part 122 as viewed from a direction orthogonal to both the first rotation axis O1 and the second rotation axis O2 is not particularly limited and may be suitably set according to various conditions. However, L6 may be preferably 90 mm or longer and 380 mm or shorter, and more preferably 140 mm or longer and 240 mm or shorter.

The distance (length) L7 from the second rotation axis O2 to the surface 1211 of the part on the inner side of the first part 121 as viewed from a direction orthogonal to both the first rotation axis O1 and the second rotation axis O2 is not particularly limited and may be suitably set according to various conditions. However, L7 may be preferably 110 mm or longer and 430 mm or shorter, and more preferably 170 mm or longer and 260 mm or shorter.

Since the robot 1 has the configuration as described above, the installation space for the robot 1, that is, the cell 5, can be made smaller than in the related-art technique. Therefore, the area of the installation space (installation area) for installing the cell 5, that is, an area S of the cell 5 when the cell 5 is viewed from the vertical direction, can be made smaller than in the related-art technique. Specifically, the area S can be reduced, for example, to 64% of the area in the related-art technique or smaller. Therefore, the width (length of one side in the horizontal direction) W of the cell 5 can be made smaller than the width in the related-art technique, and specifically, for example, 80% of the width in the related-art technique or less. As described above, in the embodiment, the cell 5 is square when viewed from the vertical direction and therefore the width (depth) W of the cell 5 in the longitudinal direction in FIG. 1 and the width (lateral width) W of the cell 5 in the lateral direction in FIG. 1 are the same. However, these widths may be different from each other. In such a case, one or both widths W can be reduced, for example, to 80% of the width in the related-art technique or less.

The area S, specifically, may be preferably smaller than 637500 mm$^2$, more preferably 500000 mm$^2$ or smaller, and even more preferably 400000 mm$^2$ or smaller. It is particularly preferable that the area S is 360000 mm$^2$ or smaller. With such an area S, the robot 1 can be prevented from interfering with the cell 5 when moving the distal end of the second arm 13 to a position that is 180 degrees different around the second rotation axis O2. Therefore, miniaturization of the cell 5 can be achieved and the installation space for installing the robot system 100 can be reduced. Thus, when a plurality of robot cells 50 is arranged to form a production line, the length of the production line can be restrained from becoming long.

Particularly the area S of 400000 mm$^2$ or smaller is substantially equal to or smaller than the size of the work area where a human works. Therefore, when the area S is 400000 mm$^2$ or smaller, for example, the human and the robot cell 50 can be easily replaced with each other. By replacing the human and the robot cell 50 with each other, the production line can be altered. Also, it is preferable that the area S is 10000 mm$^2$ or greater. This enables easy maintenance inside the robot cell 50.

The width W, specifically, may be preferably less than 850 mm, more preferably less than 750 mm, and even more preferably 650 mm or less. Thus, effects similar to the above effects can be achieved sufficiently. The width W is the average width of the cell 5 (average width of the frame part 51). Also, it is preferable that the width W is 100 mm or more. This enables easy maintenance inside the robot cell 50.

Since the robot 1 has the configuration as described above, the height (length in the vertical direction) L of the cell 5 can be made lower than the height in the related-art technique. Specifically, the length L can be reduced, for example, to 80% of the height in the related-art technique or below.

The height L, specifically, may be preferably 1700 mm or below, and more preferably 1000 mm or above and 1650 mm or below. When the height L is the upper limit value or below, the influence of vibration generated when the robot 1 operates in the cell 5 can be restrained further. The height L is the average height of the cell 5 including the foot parts 54.

As described above, in the robot system 100, by rotating the second arm 13 and the third arm 14 or the like without rotating the first arm 12, the robot 1 can move the hand 91 (distal end of the robot arm 6) to a position that is 180 degrees different around the first rotation axis O1, following the state where the angle θ formed by the first arm 12 and the second arm 13 is 0 degrees as viewed from the axial direction of the second rotation axis O2 (state where the first arm 12 and the second arm 13 overlap with each other). Therefore, the space to prevent interference of the robot 1 can be reduced. This enables miniaturization of the cell 5 and a reduction in the installation space for installing the robot system 100. Thus, for example, many robot systems 100 per unit length can be arranged along a production line, and the production line can be shortened.

Since the space to prevent interference of the robot 1 can be reduced, the ceiling part 53 can be lowered. Thus, the position of the center of gravity of the robot 1 becomes lower and the influence of vibration of the robot 1 can be reduced. That is, vibration generated by a reactive force due to the operation of the robot 1 can be restrained.

Also, the movement of the robot 1 can be reduced when moving the hand 91. For example, it is possible not to rotate the first arm 12 or to reduce the rotation angle of the first arm 12, and this enables a reduction in tact time and improvement in work efficiency.

While a rigidity of the first arm 12 is maintained, the weight of the first arm 12 can be reduced. Therefore, the operation of the robot 1 can be stabilized and a reduction in weight of the robot 1 can be achieved.

If the operation of moving the hand 91 (distal end of the robot arm 6) of the robot 1 to a position that is 180 degrees different around the first rotation axis O1 (hereinafter also referred to as "shortcut motion") is executed simply by rotating the first arm 12 around the first rotation axis O1 as in the related-art robot, there is a risk that the robot 1 may interfere with the cell 5 and peripheral devices, and therefore retreat points to avoid the interference need to be suggested to the robot 1. For example, when the robot 1 interferes with the safety board (not shown) of the cell 5 if only the first arm 12 is rotated 90 degrees around the first rotation axis O1, a retreat point needs to be suggested to the robot 1 so as not to interfere with the safety board by rotating other arms. Similarly, when the robot 1 interferes with a peripheral device, another retreat point needs to be suggested to the robot 1 so as not to interfere with the peripheral device. In this way, with the related-art robot, multiple retreat points need to be suggested. Particularly in the case of a small-sized cell, a massive number of retreat points are needed and it takes a long time and much effort to suggest these retreat points.

In contrast, in the robot 1, when executing the shortcut motion, there are very few areas and parts with the risk of interference. Therefore, the number of retreat points to be suggested can be reduced and the time and effort required for the suggestions can be reduced. That is, in the robot 1, the number of retreat points to be suggested is, for example, approximately one third of that in the related-art robot and the suggestions are considerably easier.

An area (part) 101 surrounded by double-dotted chain lines on the right side of FIG. 4, of the third arm 14 and the fourth arm 15, is an area (part) where the robot 1 does not interfere or does not easily interfere with the robot 1 itself or other members. Therefore, when a predetermined member is installed in the area 101, the member does not easily interfere with the robot 1 and peripheral devices or the like. Therefore, in the robot 1, a predetermined member can be installed in the area 101. Particularly, when the predetermined member is installed in the area on the right side of FIG. 4 of the third arm 14, of the area 101, the probability of the member interfering with peripheral devices (not shown) arranged on the work table 52 drops further, which is more effective.

The device that can be installed in the area 101 may be, for example, a controller for controlling driving of a sensor of a hand, hand-eye camera or the like, or an electromagnetic valve of an attraction mechanism, or the like.

As a specific example, when an attraction mechanism is to be provided on a hand, for example, if an electromagnetic valve or the like is installed in the area 101, the electromagnetic valve does not obstruct the driving of the robot 1. In this way, the area 101 is highly convenient.

Second Embodiment

Figure 8:
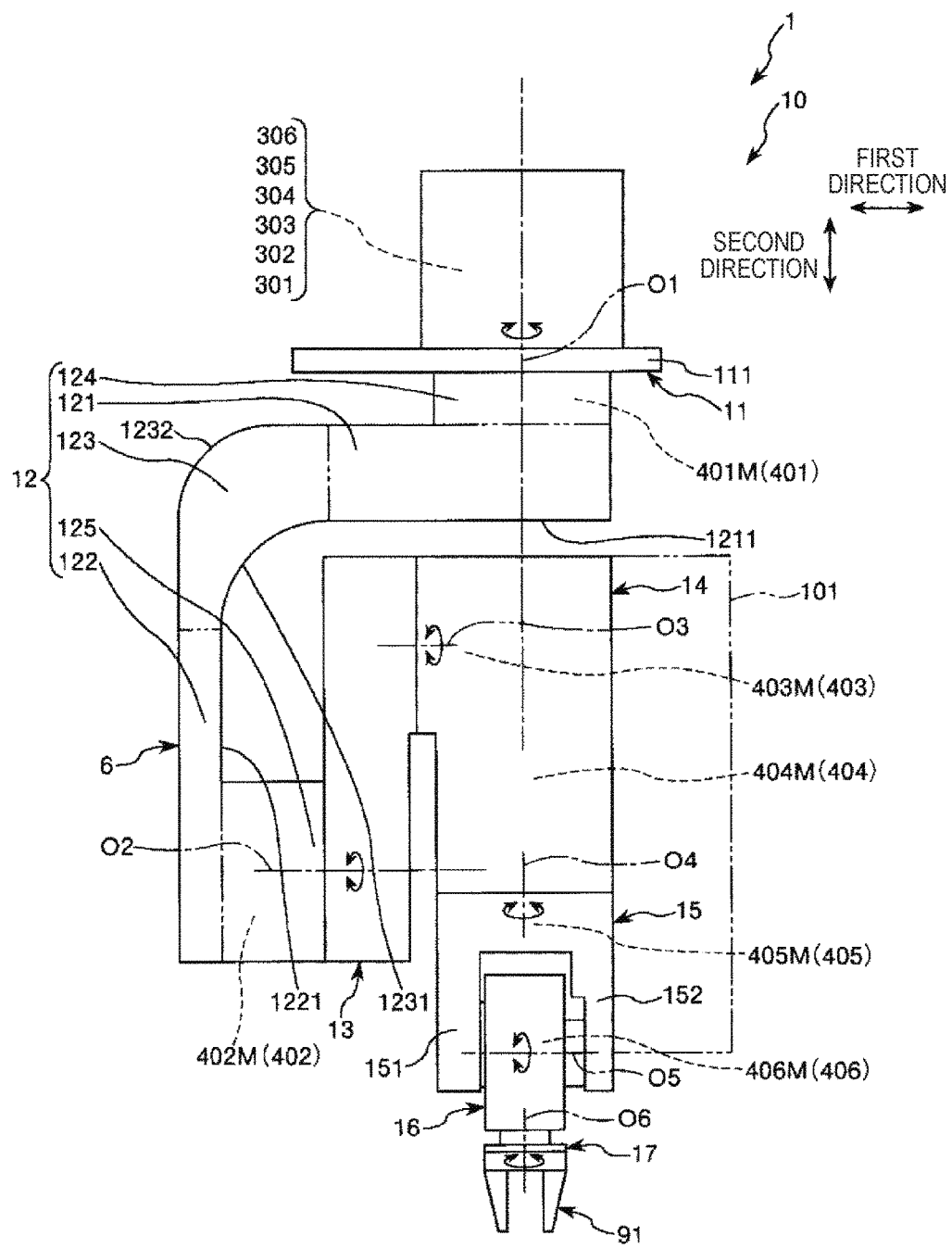
FIG. 8 is a front view showing a second embodiment of the robot according to the invention.

FIG. 8 is a front view showing a second embodiment of the robot according to the invention.

Hereinafter, the second embodiment will be described, mainly in terms of the difference from the first embodiment, and similar features will not be described further in detail.

As shown in FIG. 8, in the robot 1 of the second embodiment, the intermediate part 123 of the first arm 12 is bent, as viewed from a direction orthogonal to both the first rotation axis O1 and the second rotation axis O2.

More specifically, the surface of the third part 1231, which is the part on the inner side (bottom right-hand side in FIG. 8) of the intermediate part 123, and the surface of the part 1232 on the outer side (top left-hand side in FIG. 8), are each curved (bent), as viewed from a direction orthogonal to both the first rotation axis O1 and the second rotation axis O2.

Thus, as described in the first embodiment, the rigidity of the first arm 12 can be increased and the operation of the robot 1 can be stabilized.

The second embodiment, as described above, can achieve effects similar to those of the first embodiment.

Third Embodiment

Figure 9:
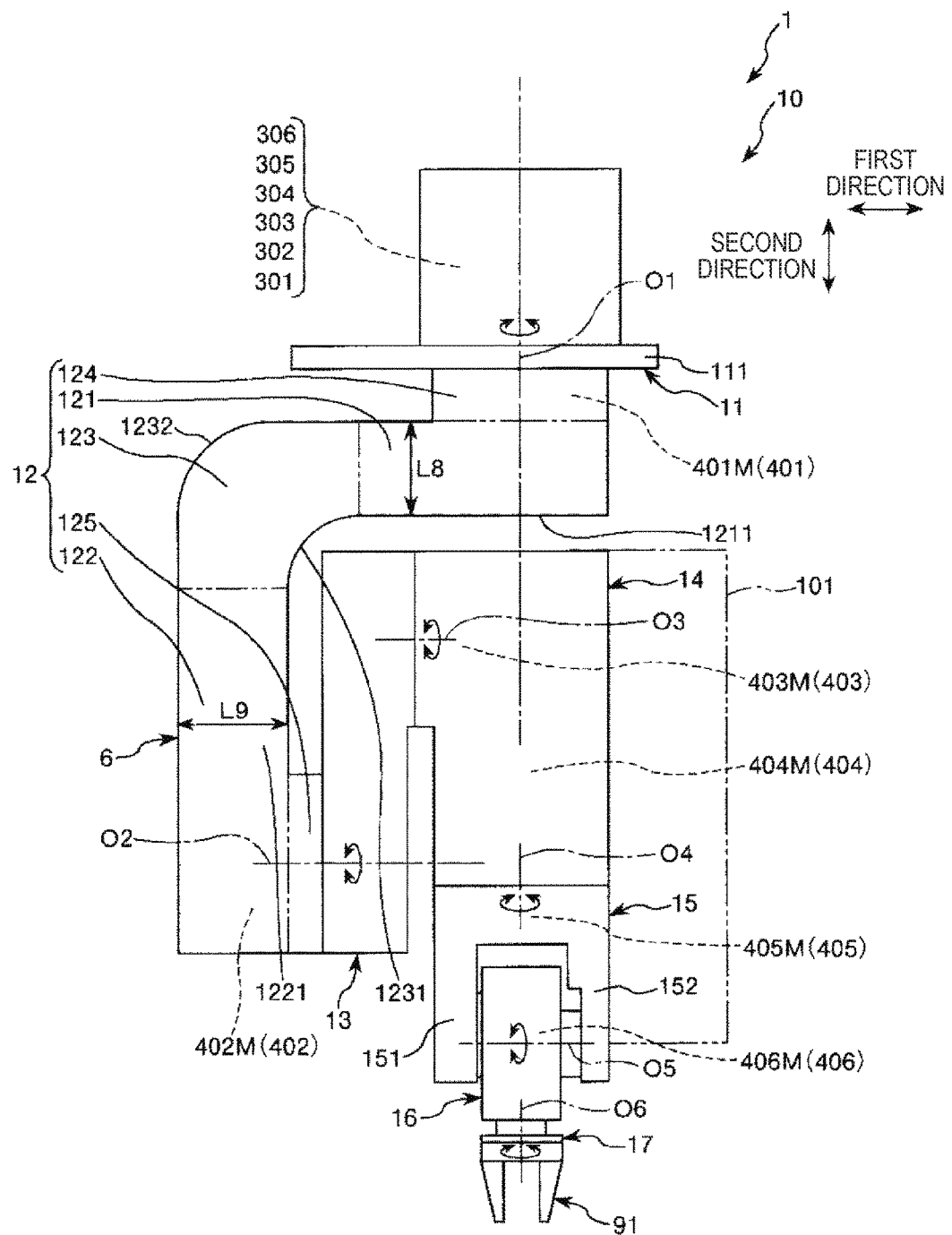
FIG. 9 is a front view showing a third embodiment of the robot according to the invention.

FIG. 9 is a front view showing a third embodiment of the robot according to the invention.

Hereinafter, the third embodiment will be described, mainly in terms of the difference from the first embodiment, and similar features will not be described further in detail.

As shown in FIG. 9, in the robot 1 of the third embodiment, the intermediate part 123 of the first arm 12 is bent, as viewed from a direction orthogonal to both the first rotation axis O1 and the second rotation axis O2.

More specifically, the surface of the third part 1231, which is the part on the inner side (bottom right-hand side in FIG. 9) of the intermediate part 123, and the surface of the part 1232 on the outer side (top left-hand side in FIG. 9) are each curved (bent), as viewed from a direction orthogonal to both the first rotation axis O1 and the second rotation axis O2.

Thus, as described in the first embodiment, the rigidity of the first arm 12 can be increased and the operation of the robot 1 can be stabilized.

Also, the length L9 of the second part 122 in the axial direction of the second rotation axis O2 is longer than the length L8 of the first part 121 in the axial direction of the first rotation axis O1, as viewed from a direction orthogonal to both the first rotation axis O1 and the second rotation axis O2.

Thus, the rigidity of the first arm 12 can be increased further and the operation of the robot 1 can be stabilized.

The third embodiment, as described above, can achieve effects similar to those of the first embodiment.

Fourth Embodiment

Figure 10:
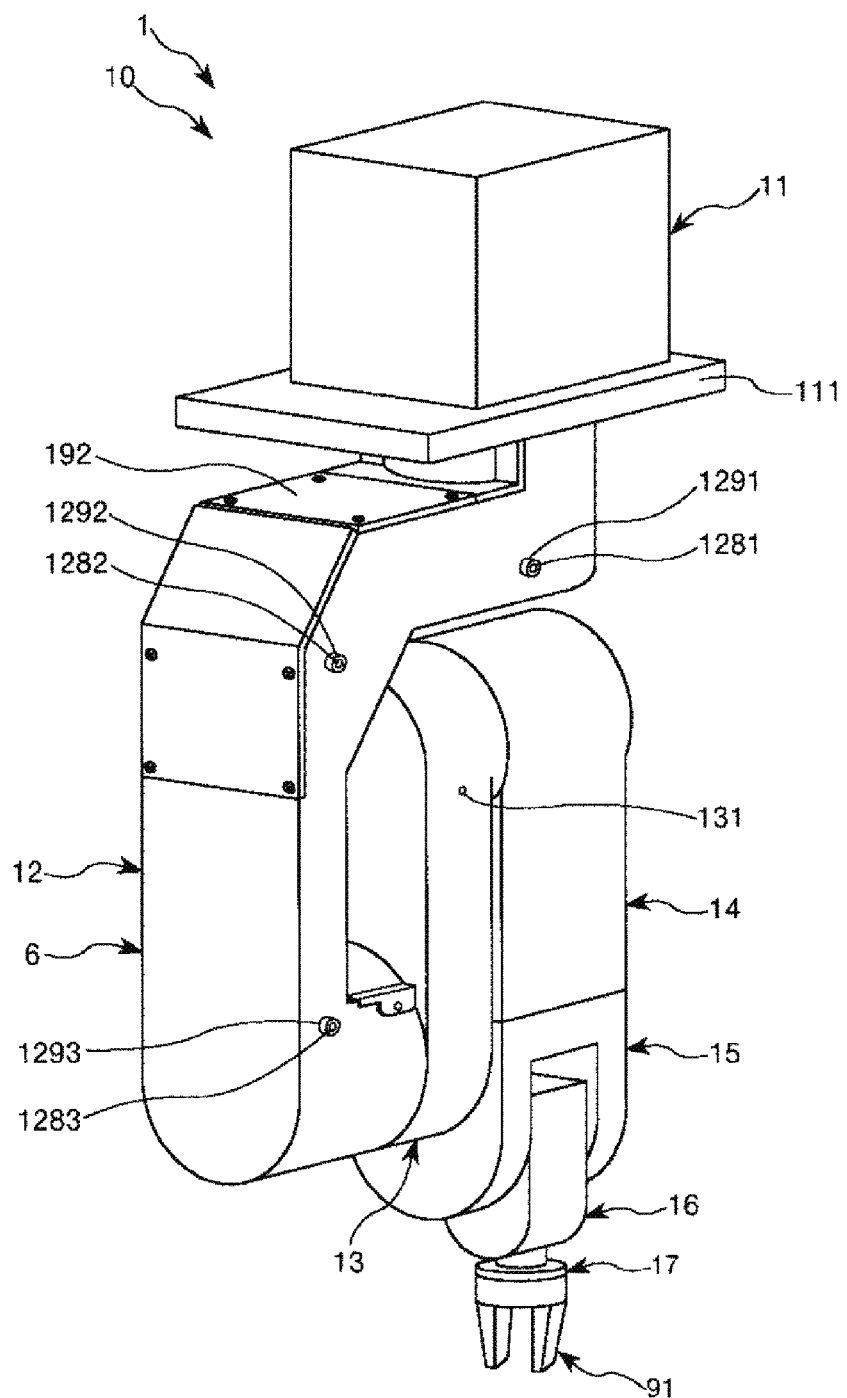
FIG. 10 is a perspective view showing a fourth embodiment of the robot according to the invention.
Figure 11:
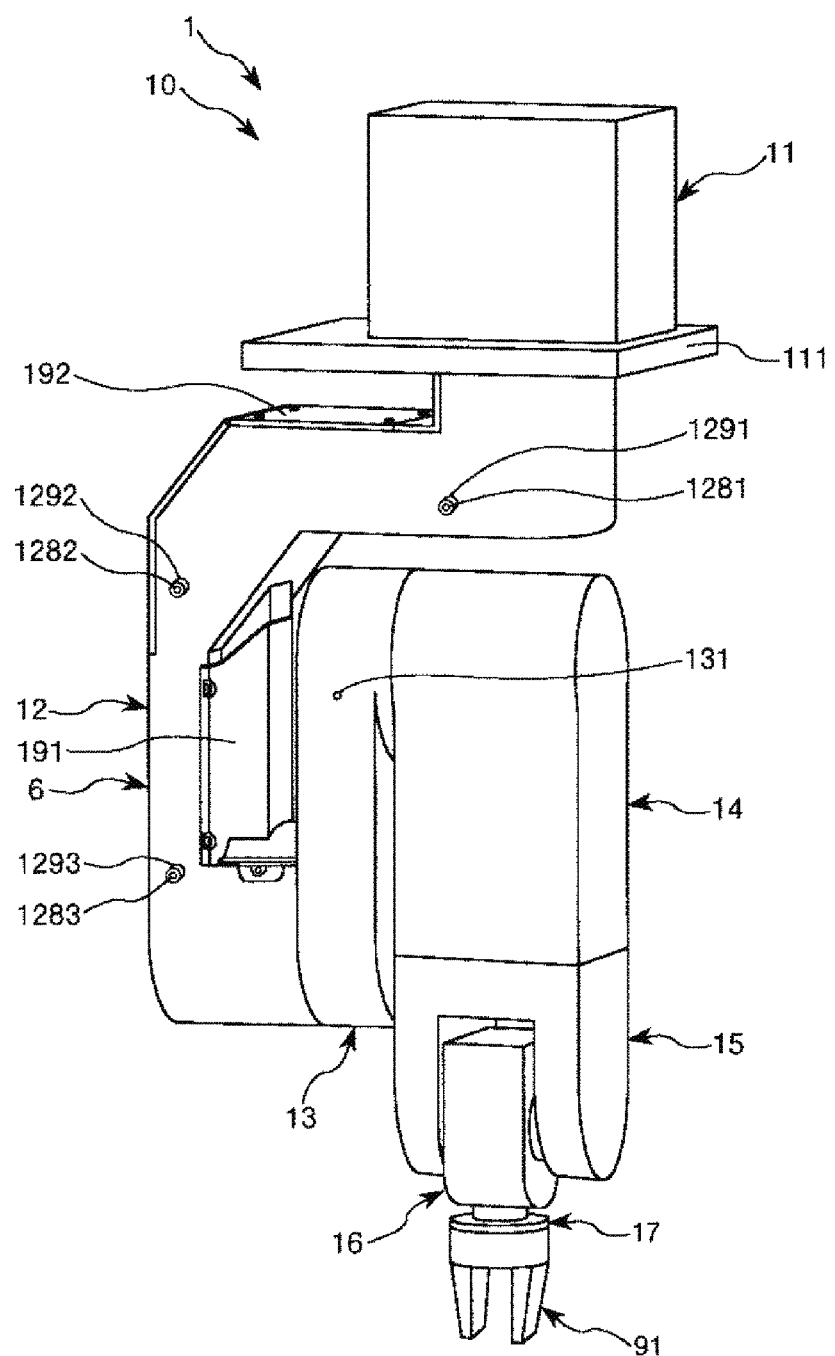
FIG. 11 is a perspective view showing the fourth embodiment of the robot according to the invention.
Figure 12:
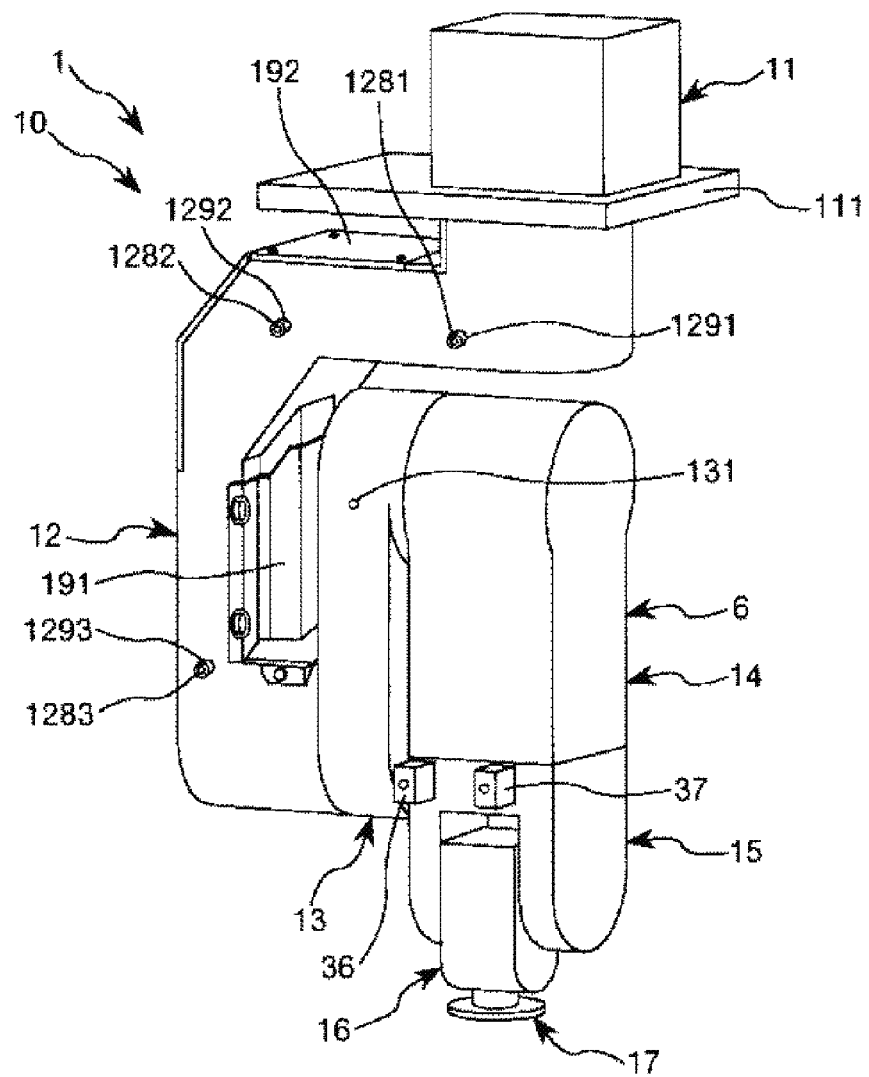
FIG. 12 explains calibration in a fifth embodiment of the robot according to the invention.

FIGS. 10 and 11 are perspective views showing a fourth embodiment of the robot according to the invention.

Hereinafter, the fourth embodiment will be described, mainly in terms of the difference from the first embodiment, and similar features will not be described further in detail.

As shown in FIGS. 10 and 11, in the robot 1 of the fourth embodiment, an opening is formed in the parts on the outer side of the first part 121, the intermediate part 123 and the second part 122 of the first arm 12, and a cover member 192 is removably provided so as to cover the opening.

Thus, accessibility to the inside of the first arm 12 is improved and various kinds of work such as inspection, repair, and replacement can be easily carried out on each part such as the wire and the substrate arranged inside the first arm 12.

By using a material with a high rigidity, particularly a material with a higher rigidity than the material forming the first arm 12, as the material forming the cover member 192, the rigidity of the first arm 12 can be increased further.

Also, an opening is formed in the parts on the inner side of the intermediate part 123 and the second part 122 of the first arm 12, and a cover member 191 is removably provided so as to cover the opening.

Thus, accessibility to the inside of the first arm 12 is improved and various kinds of work such as inspection, repair, and replacement can be easily carried out on each part such as the wire and the substrate arranged inside the first arm 12.

Since the part on the inner side of the first arm 12 has little influence on the rigidity of the first arm 12, this part may be of low rigidity. Therefore, the material forming the cover member 191 may be selected from a broad range of materials. As the material forming the cover member 191, for example, various resin materials or the like can be used.

The cover members 191 and 192 are not considered as components of the first arm 12.

The fourth embodiment, as described above, can achieve effects similar to those of the first embodiment.

Fifth Embodiment

FIGS. 12 to 19 each explain calibration in a fifth embodiment of the robot according to the invention.

Hereinafter, an embodiment of calibration of the robot 1 will be described as the fifth embodiment. As the robot 1, the fourth embodiment is used as an example.

In the fifth embodiment, as calibration of the robot 1, the robot 1 is placed into a predetermined attitude and an origin (zero-point) of each encoder for the motors 401M, 402M, 403M, 404M is set, as follows.

Figure 13:
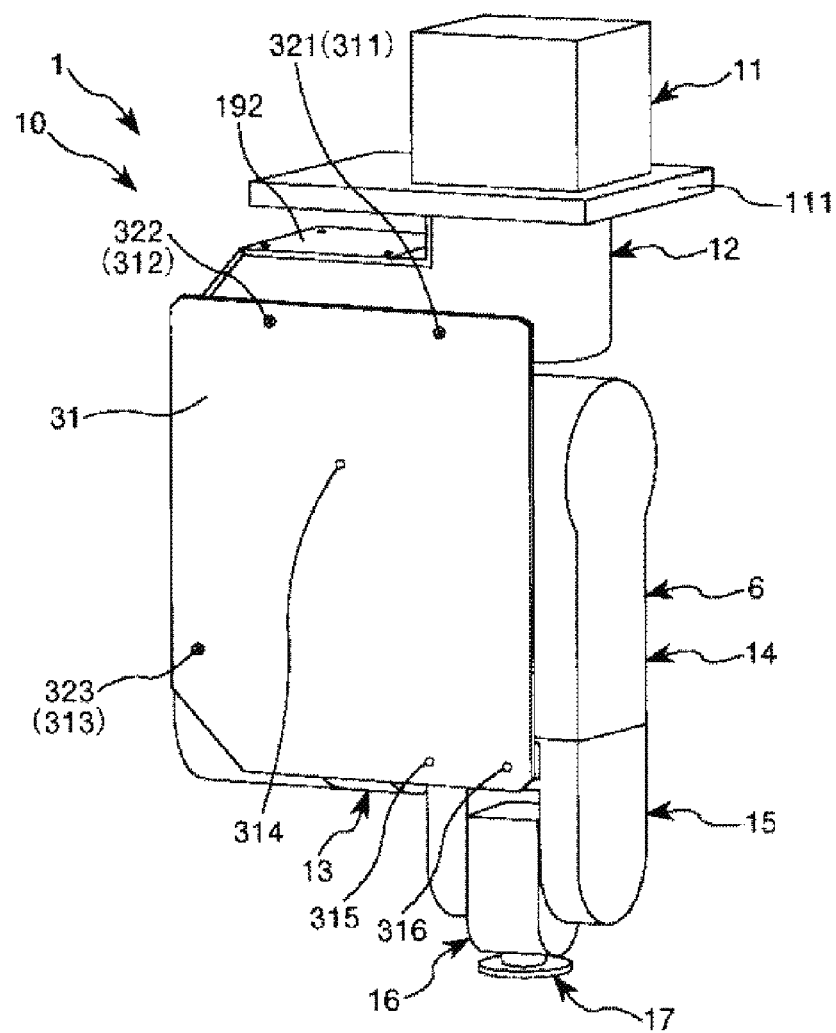
FIG. 13 explains calibration in the fifth embodiment of the robot according to the invention.

In the calibration of the robot 1, a plate 31 shown in FIG. 13 is used. The plate 31 is removably attached to a lateral surface (surface to the front of the face of FIG. 12) of the first arm 12 of the robot 1 at the time of calibration.

Six holes 311, 312, 313, 314, 315, 316 are formed at predetermined positions in the plate 31. The plate 31 may be opaque. However, it is preferable that the plate 31 is transparent, that is, light-transmissive. Thus, at the time of calibration, the robot 1 can be visually recognized via the plate 31.

On the lateral surface of the first arm 12 of the robot 1, three protruding support parts 1291, 1292, 1293 for supporting the plate 31 are formed. The top surface of each of the support parts 1291, 1292, 1293 is a flat surface. Also, female screws 1281, 1282, 1283 are formed at the positions of the support parts 1291, 1292, 1293 of the first arm 12, respectively. The shape of each of the support parts 1291, 1292, 1293 is not limited to the illustrated shape and may have a pointed tip, for example. As an alternative configuration, for example, support parts and female screws may be formed separately and the support parts may be arranged near the female screws.

A female screw 131 is formed at a predetermined position on a lateral surface of the second arm 13.

Two attachments 36, 37 formed with female screws can be removably attached to predetermined positions on a lateral surface of the fourth arm 15.

Figure 14:
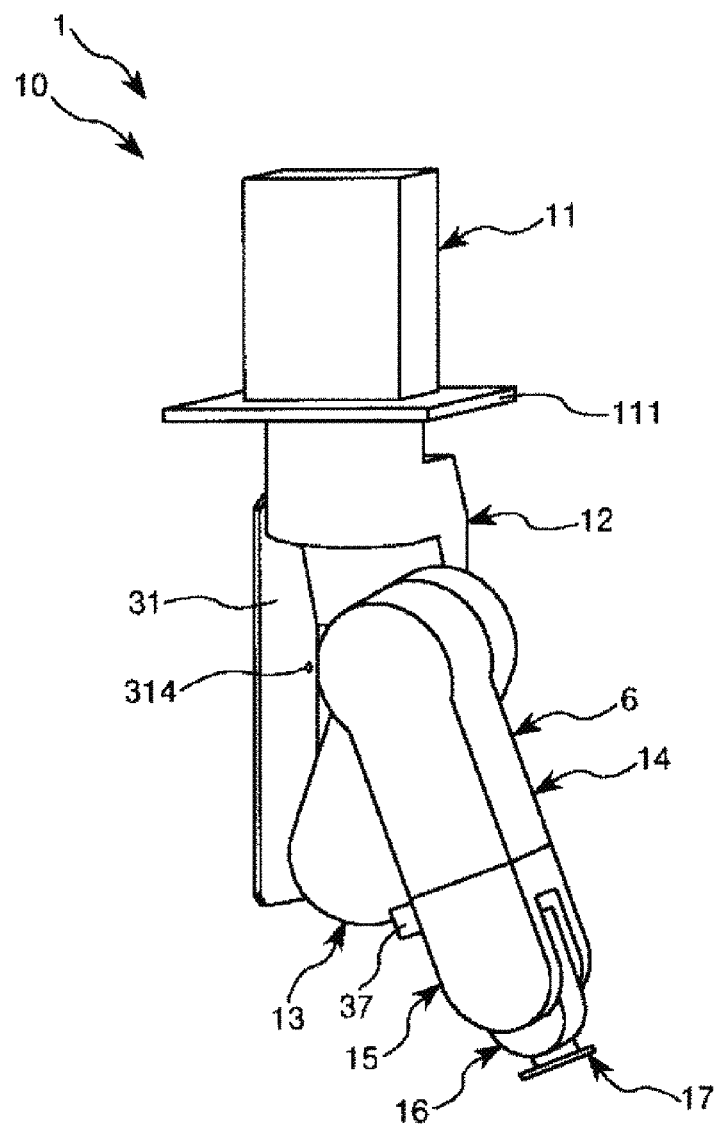
FIG. 14 explains calibration in the fifth embodiment of the robot according to the invention.

At the time of calibration, the plate 31 is attached to the lateral surface of the first arm 12 of the robot 1, as shown in FIG. 13. To attach the plate 31, male screws 321, 322, 323 are inserted through the holes 311, 312, 313 in the plate 31 and meshed with the female screws 1281, 1282, 1283 on the first arm 12, thus screwing the plate 31. At this time, the second arm 13 is arranged at a position where the second arm 13 does not contact the plate 31, as shown in FIG. 14.

Also, the attachments 36, 37 are attached to the lateral surface of the fourth arm 15.

Figure 15:
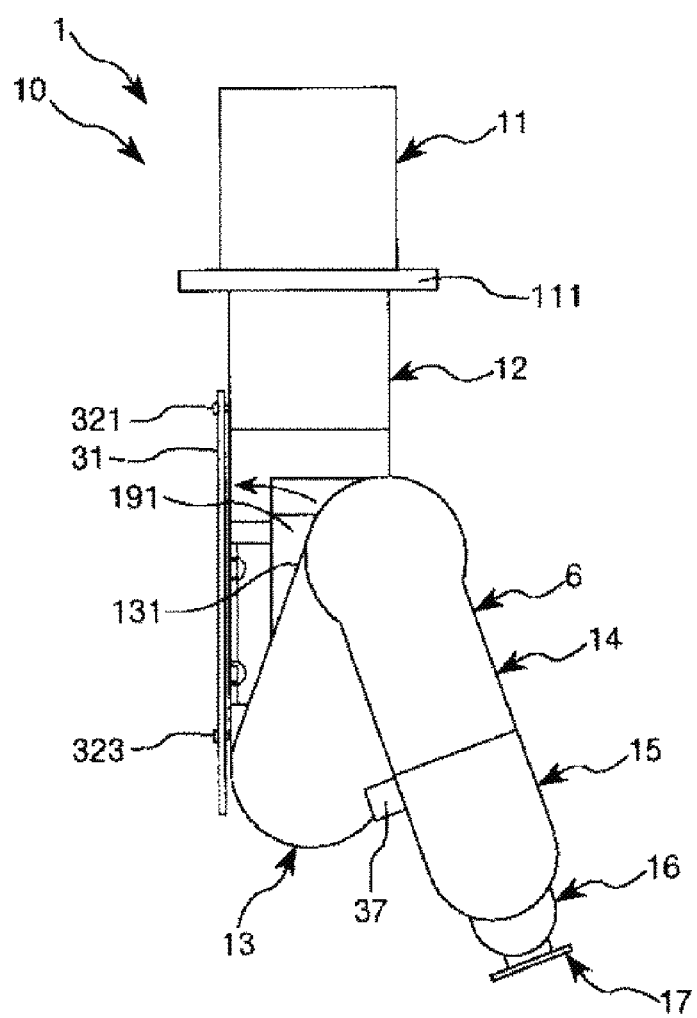
FIG. 15 explains calibration in the fifth embodiment of the robot according to the invention.

Next, in the state where the driving of the brake on the second arm 13 is stopped, the second arm 13 is manually rotated around the second rotation axis O2 so as to cause the second arm 13 to contact the plate 31, as shown in FIG. 15.

Figure 16:
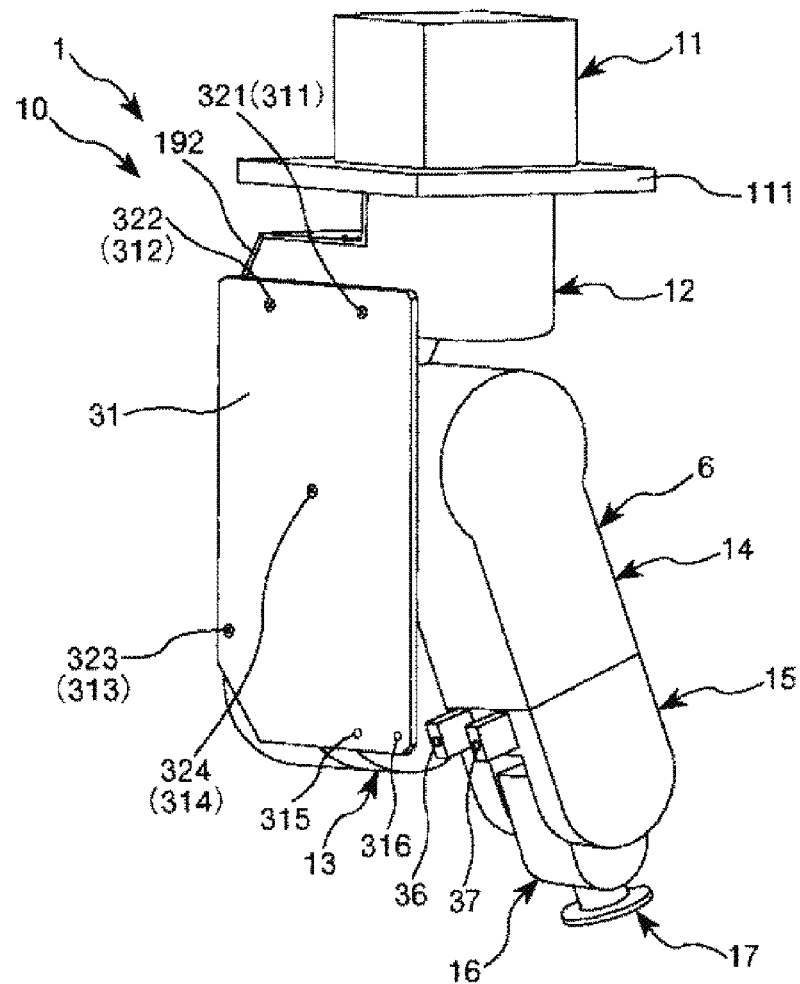
FIG. 16 explains calibration in the fifth embodiment of the robot according to the invention.

Then, a male screw 324 is inserted through the hole 314 in the plate 31 and meshed with the female screw 131 on the second arm 13, thus screwing the second arm 13 to the plate 31, as shown in FIG. 16. At this time, the third arm 14 is arranged at a position where the third arm 14 does not contact the plate 31.

Figure 17:
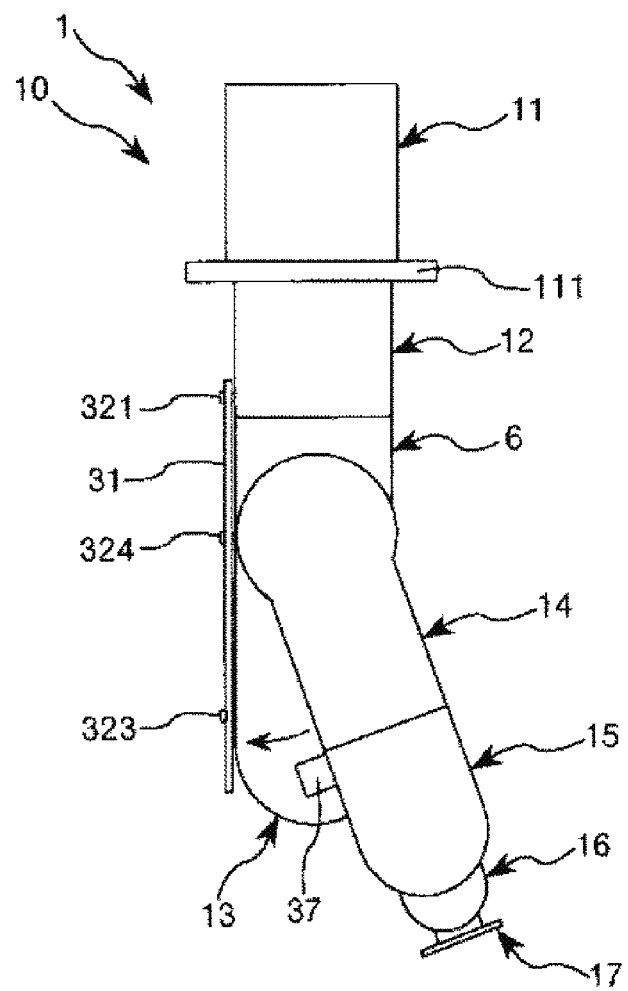
FIG. 17 explains calibration in the fifth embodiment of the robot according to the invention.
Figure 18:
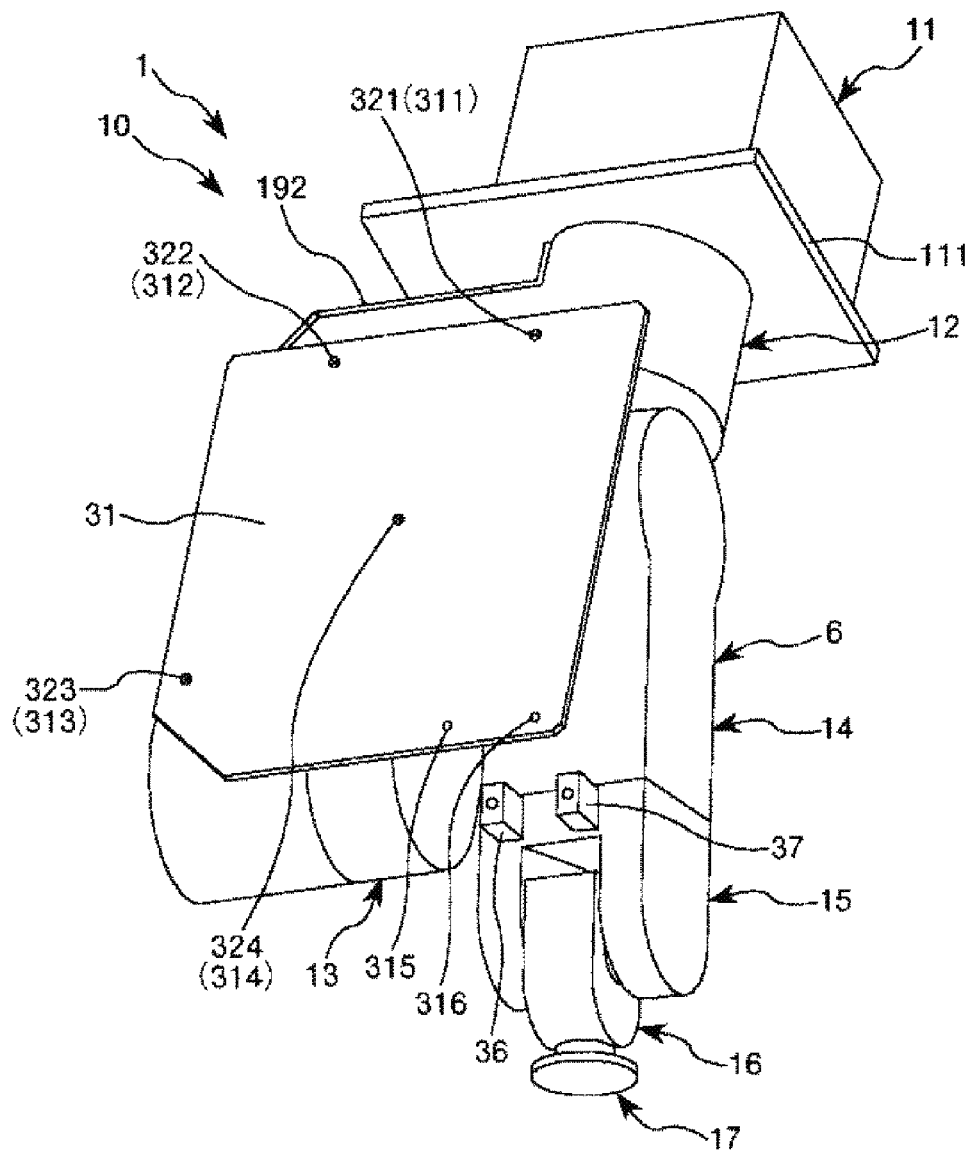
FIG. 18 explains calibration in the fifth embodiment of the robot according to the invention.

Next, in the state where the driving of the brake on the third arm 14 and the brake on the fourth arm 15 is stopped, the third arm 14 is manually rotated around the third rotation axis O3 so as to move the third arm 14 closely to the plate 31, and the fourth arm 15 is manually rotated around the fourth rotation axis O4 so as to cause the attachments 36, 37 to contact the plate 31, as shown in FIGS. 17 and 18.

Figure 19:
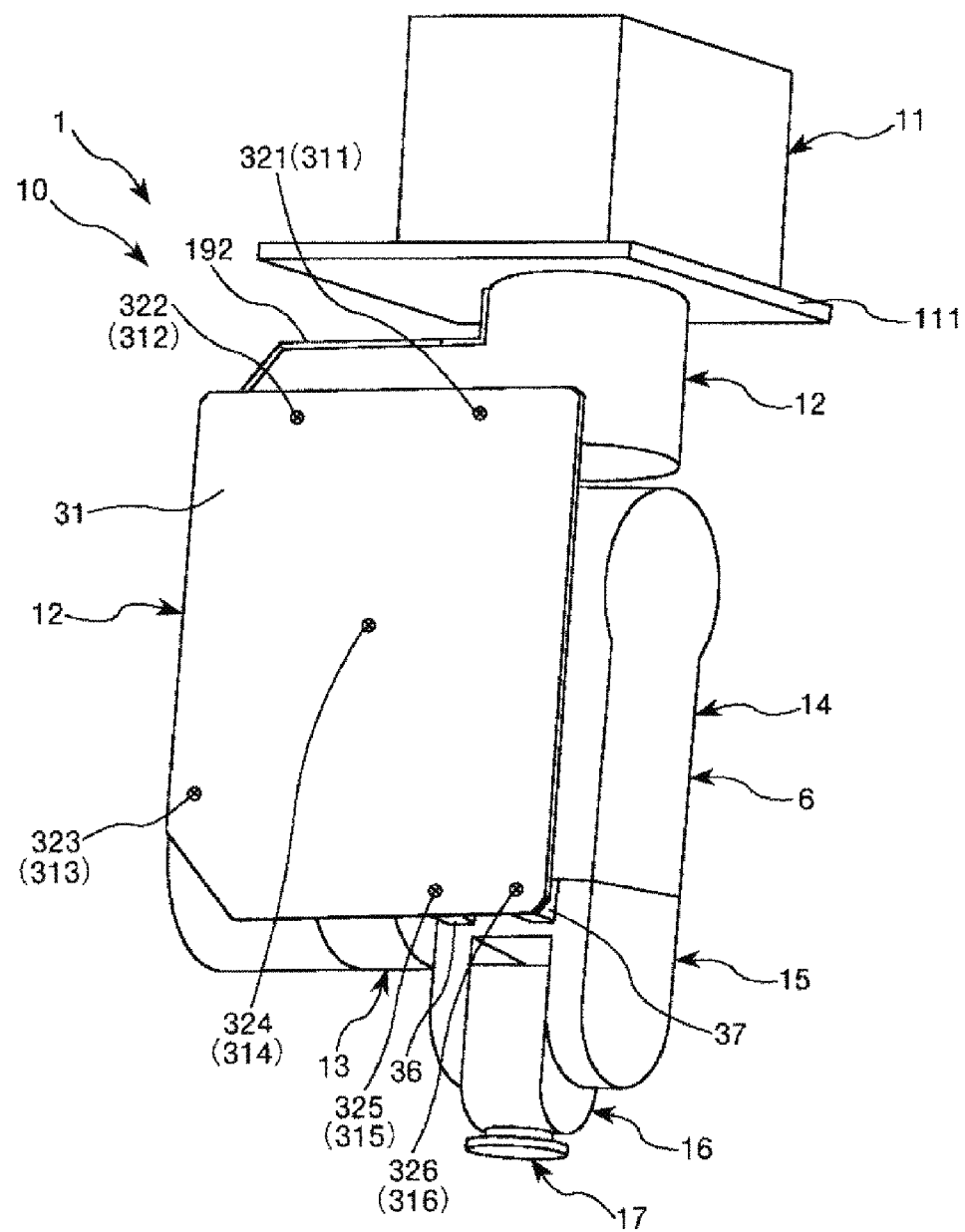
FIG. 19 explains calibration in the fifth embodiment of the robot according to the invention.

Then, male screws 325, 326 are inserted through the holes 315, 316 in the plate 31 and meshed with the female screws on the attachments 36, 37, thus screwing the fourth arm 15 to the plate 31, as shown in FIG. 19. At this time, the fifth arm 16 is arranged at a position where the fifth arm 16 and the sixth arm 17 do not contact the plate 31.

Next, an origin (zero-point) of each encoder for the motors 401M, 402M, 403M, 404M is set.

Finally, the plate 31 and the attachments 36, 37 are removed from the robot 1. The calibration thus ends.

The setting of an origin of the encoder for the motor 405M can be carried out similarly to the above.

Sixth Embodiment

Hereinafter, a sixth embodiment will be described, mainly in terms of the difference from the first embodiment, and similar features will not be described further in detail.

Figure 20:
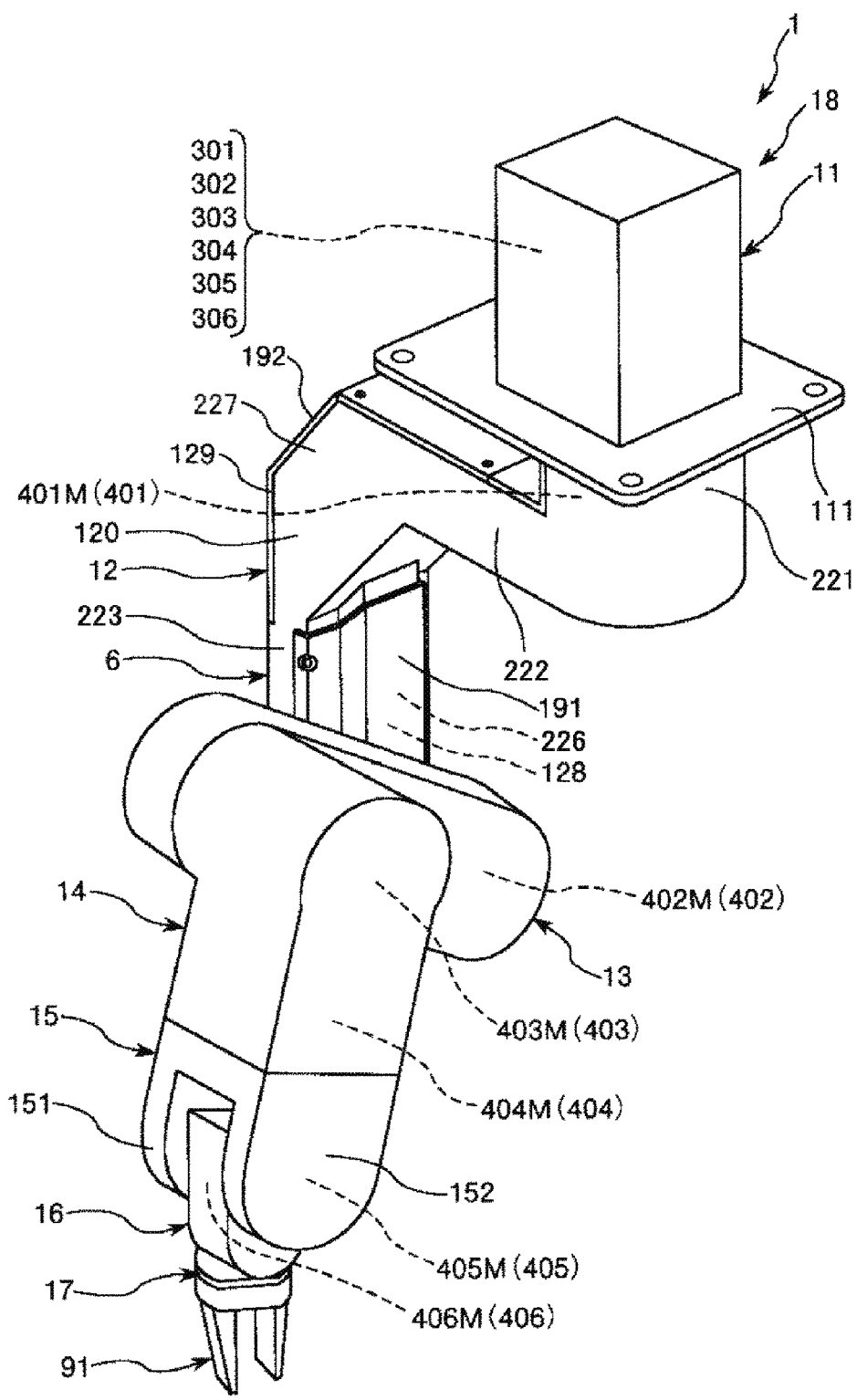
FIG. 20 is a perspective view showing the sixth embodiment of the robot in the robot system shown in FIG. 1.
Figure 21:
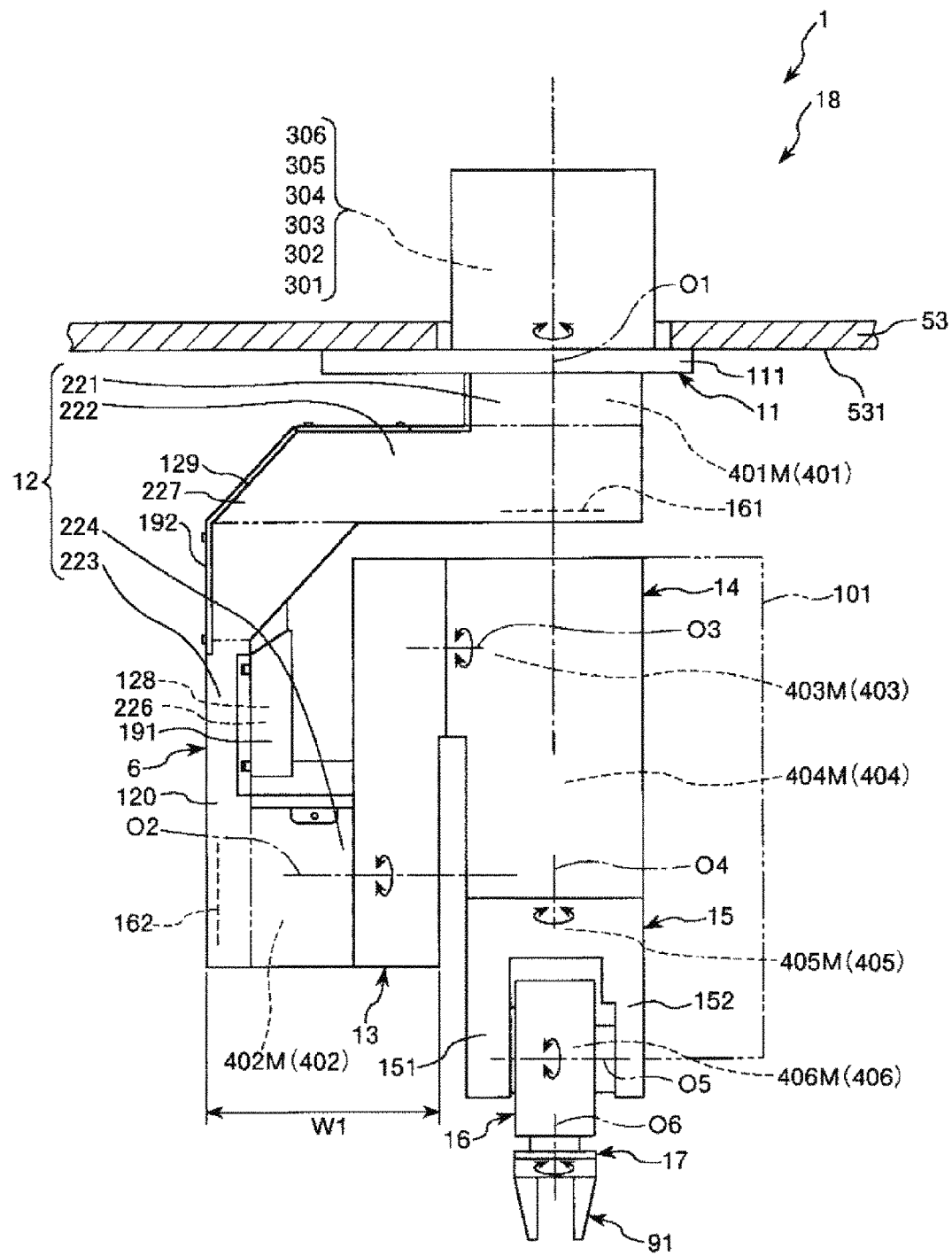
FIG. 21 shows the sixth embodiment of the robot in a front view of the robot system shown in FIG. 1.
Figure 22:
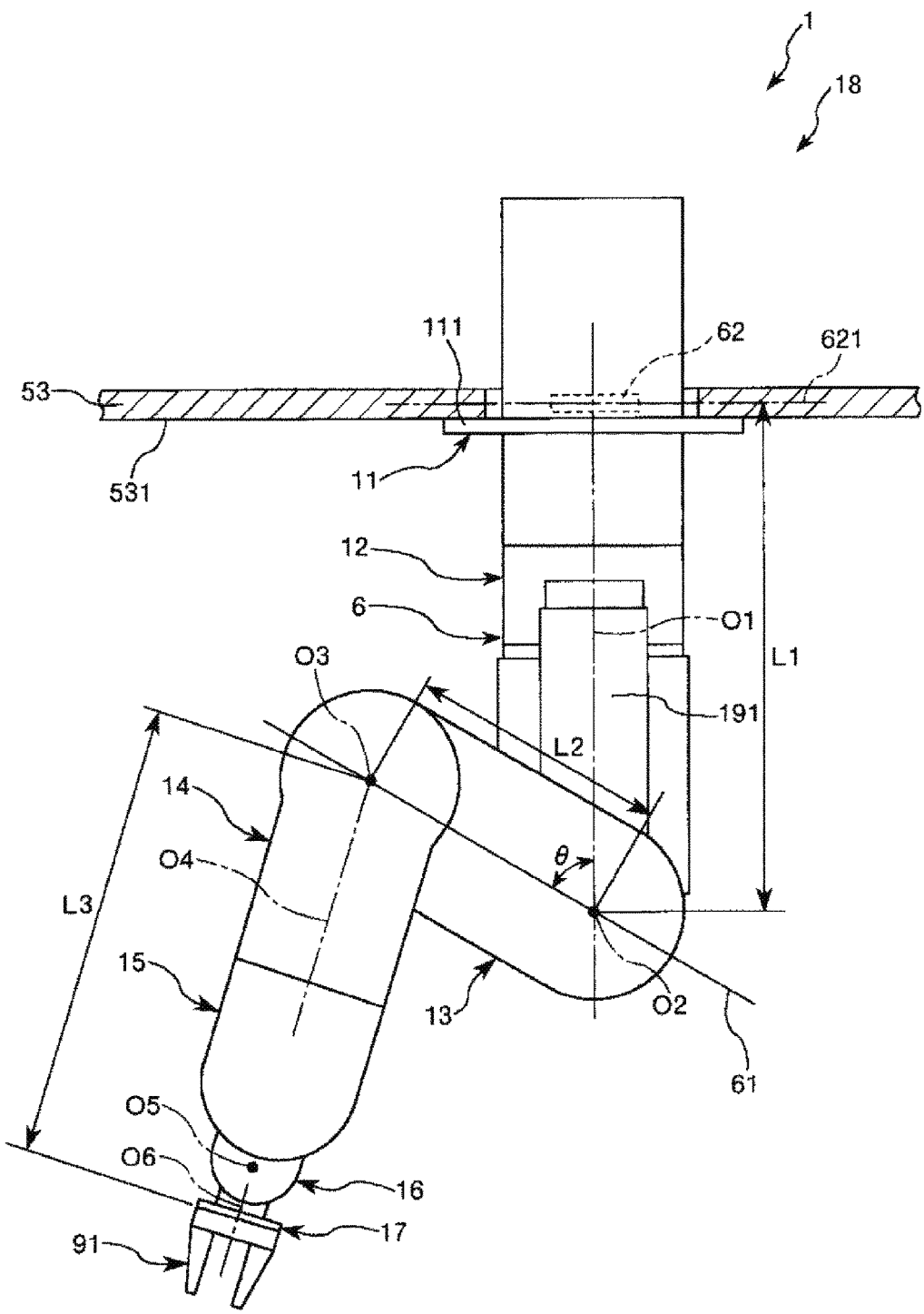
FIG. 22 shows the sixth embodiment of the robot in a side view of the robot system shown in FIG. 1.
Figure 23:
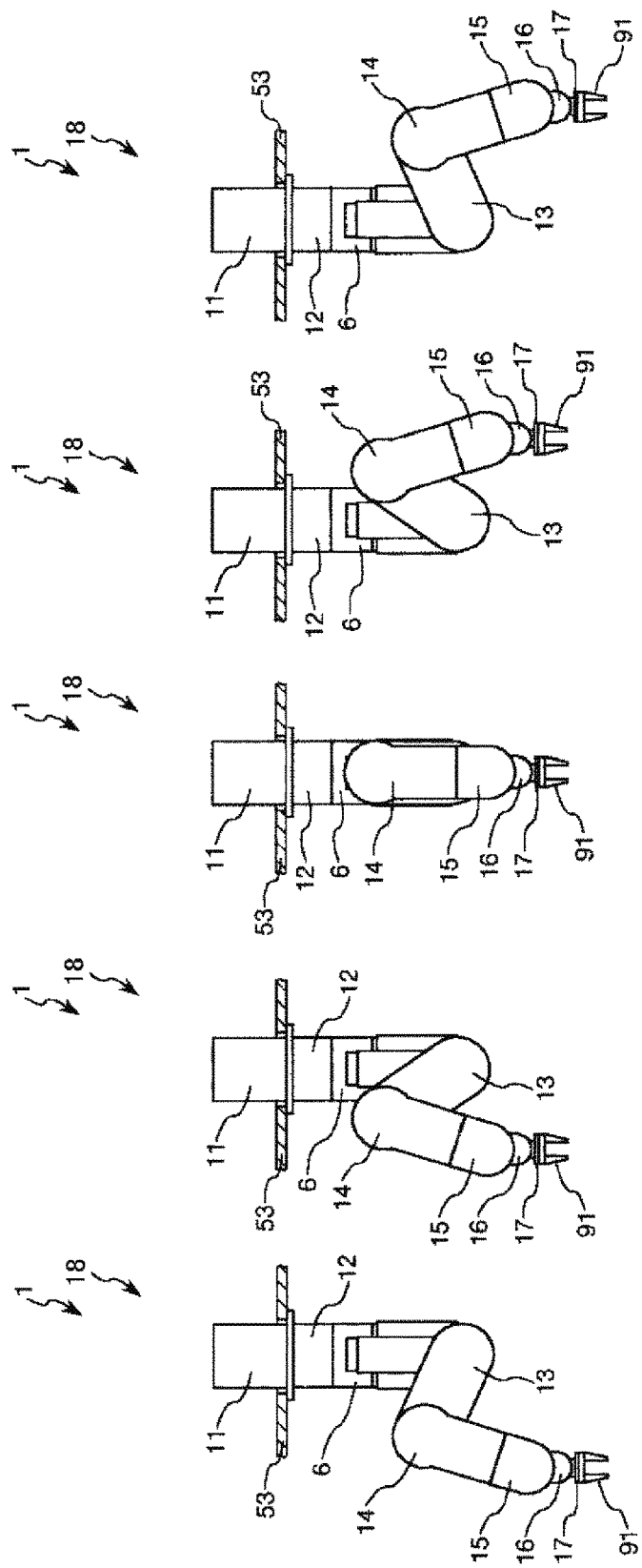
FIGS. 23A to 23E explain an operation when the robot in the robot system in the sixth embodiment shown in FIG. 1 carries out work.
Figure 24:
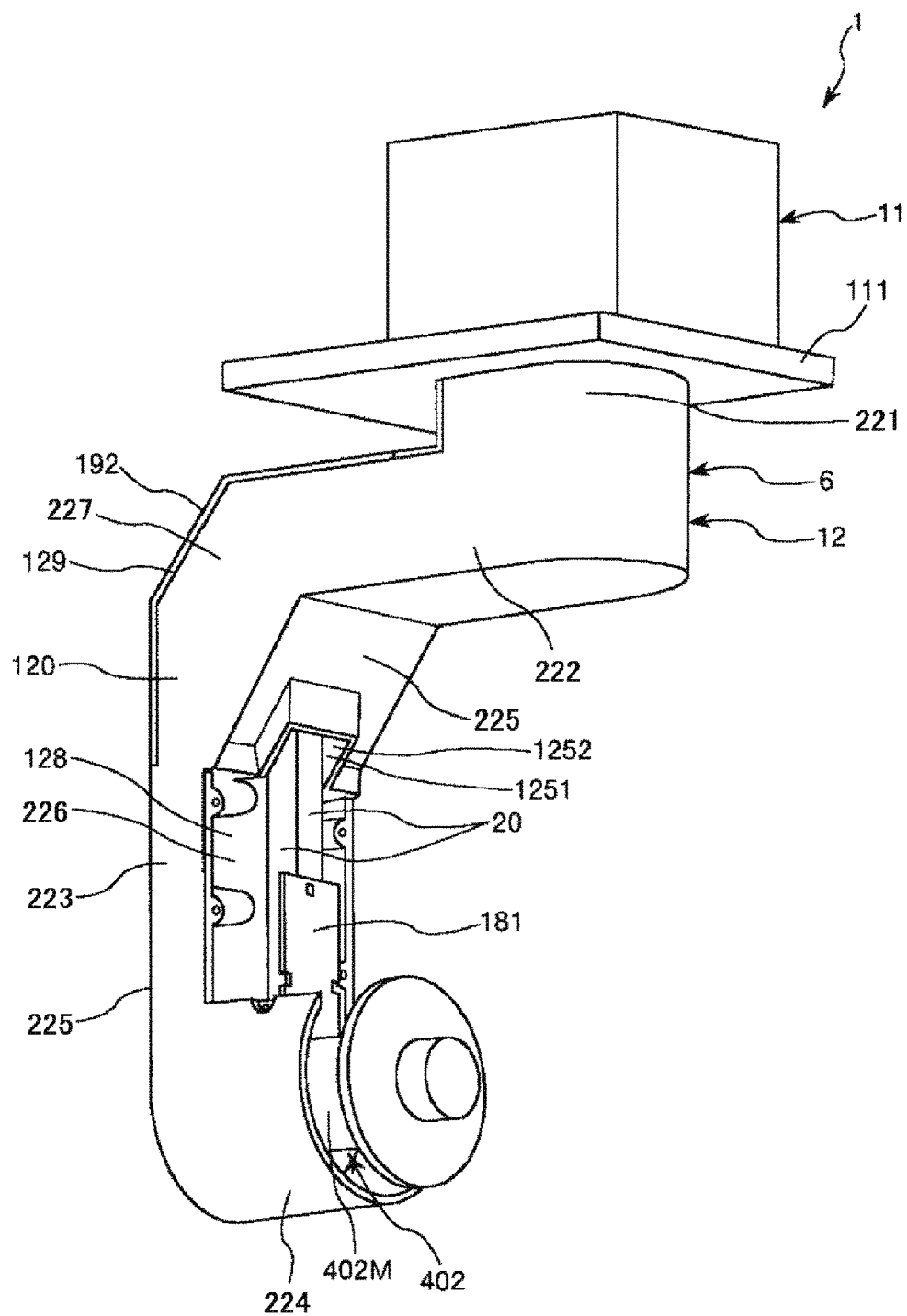
FIG. 24 is a perspective view showing the state where the cover part on the inner side of the first arm is removed in the sixth embodiment of the robot in the robot system shown in FIG. 1.
Figure 25:
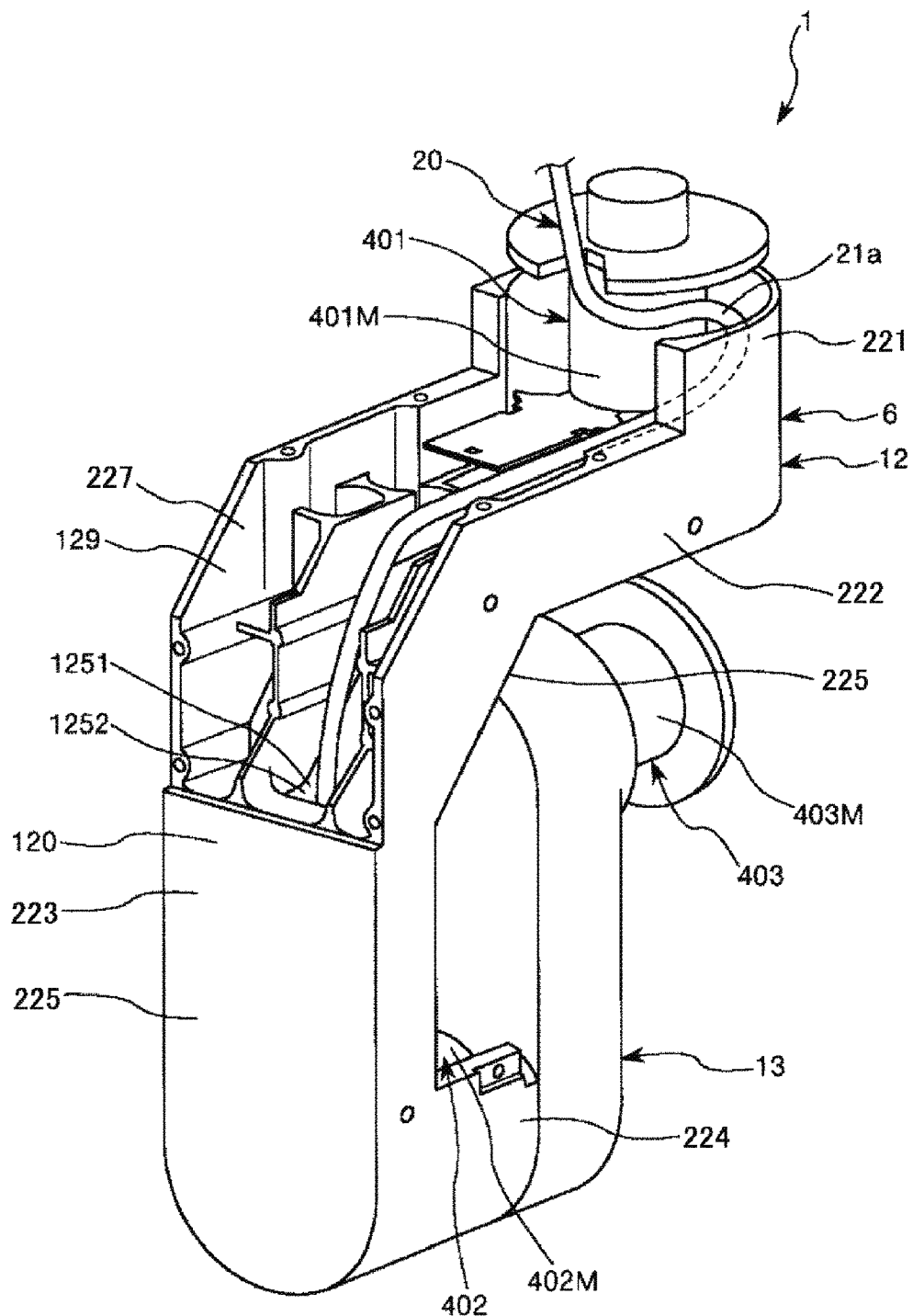
FIG. 25 is a perspective view showing the state where the cover part on the inner side of the first arm and the cover part on the outer side are removed in the sixth embodiment of the robot in the robot system shown in FIG. 1.
Figure 26:
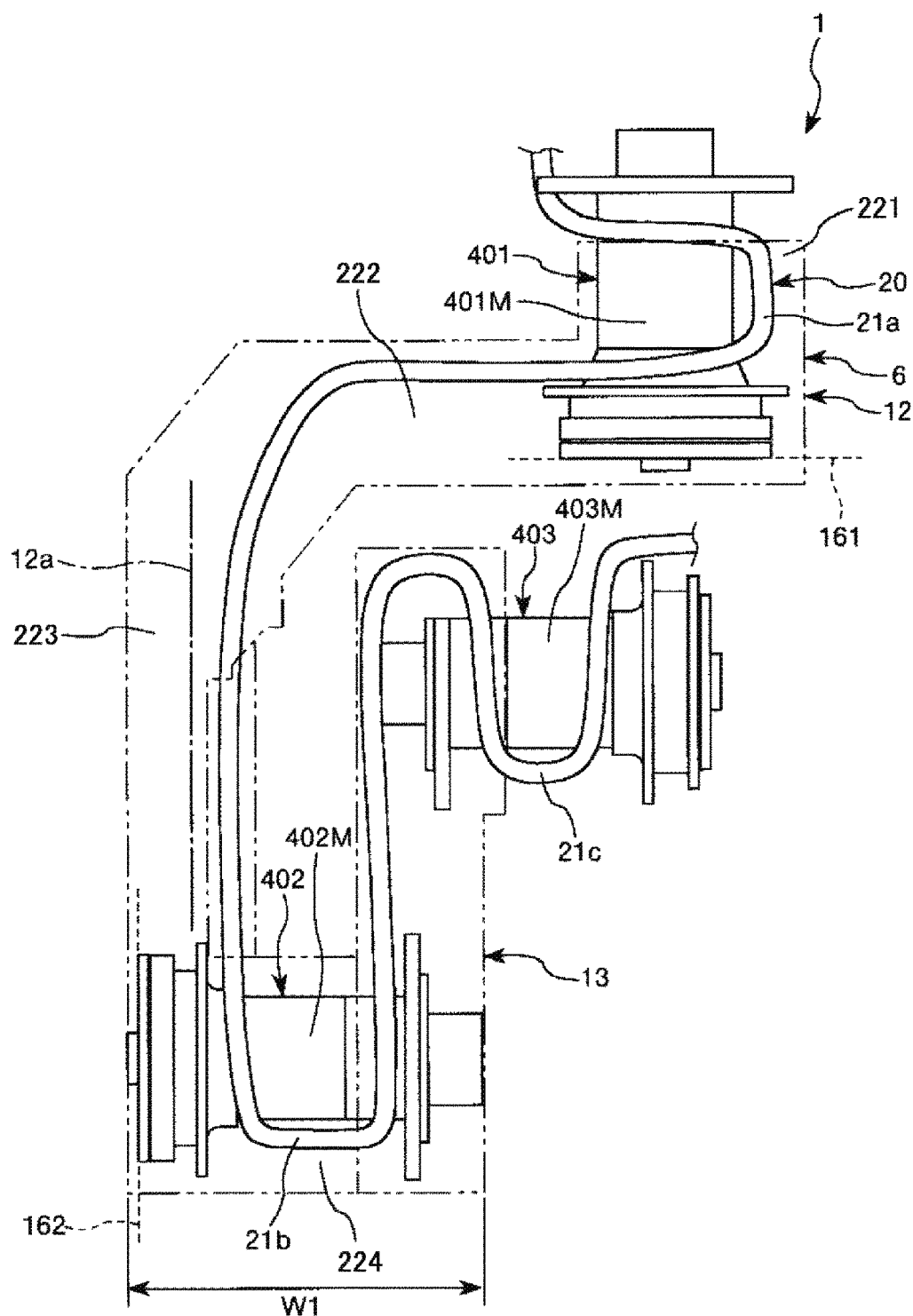
FIG. 26 explains the arrangement of a cable in the sixth embodiment of the robot in the robot system shown in FIG. 1.
Figure 27:
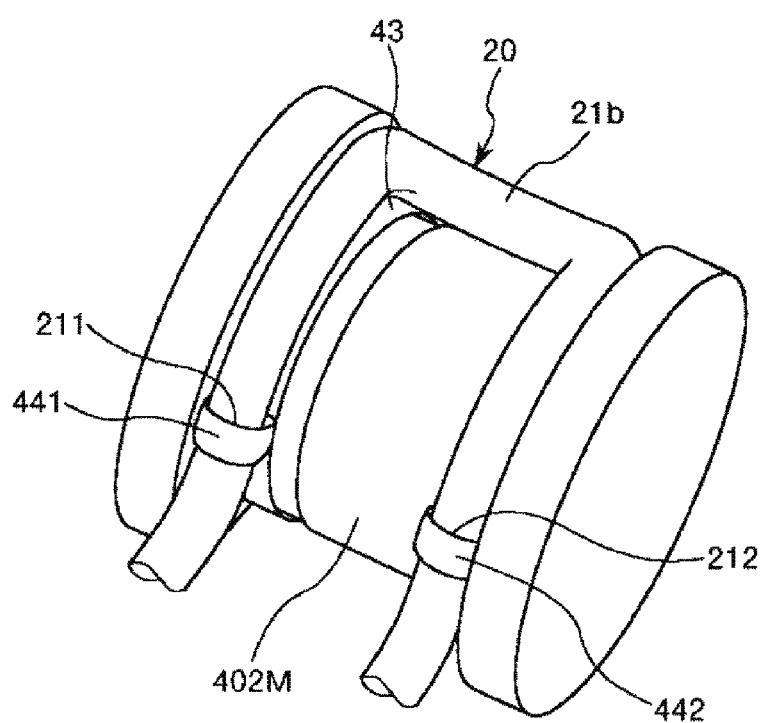
FIG. 27 explains the arrangement of a cable in the sixth embodiment of the robot in the robot system shown in FIG. 1.

FIG. 1 is a perspective view showing a robot system having the sixth embodiment of the robot according to the invention. FIG. 20 is a perspective view showing the sixth embodiment of the robot in the robot system shown in FIG. 1. FIG. 21 shows the sixth embodiment of the robot in a front view of the robot system shown in FIG. 1. FIGS. 22 and 6 each show the sixth embodiment of the robot in a side view of the robot system shown in FIG. 1. That is, the robot shown in FIGS. 22 and 6 is the robot shown in FIG. 21 as viewed from the right in FIG. 21. FIGS. 23A to 23E explain the operation when the robot in the robot system in the sixth embodiment shown in FIG. 1 carries out work. FIG. 24 is a perspective view showing the state where the cover part on the inner side of the first arm is removed in the sixth embodiment of the robot in the robot system shown in FIG. 1. FIG. 25 is a perspective view showing the state where the cover part on the inner side of the first arm and the cover part on the outer side are removed in the sixth embodiment of the robot in the robot system shown in FIG. 1. FIG. 26 explains the arrangement of a cable in the sixth embodiment of the robot in the robot system shown in FIG. 1. FIG. 27 explains the arrangement of a cable in the sixth embodiment of the robot in the robot system shown in FIG. 1.

In the description below, as a matter of convenience of explanation, the top side in FIGS. 21 to 26 is referred to as "top" or "upper part", and the bottom side is referred to as "bottom" or "lower part". The base side in FIGS. 20 to 26 is referred to as "proximal end" or "upstream", and the opposite side (hand side) is referred to as "distal end" or "downstream". The up-down direction in FIGS. 20 to 26 is the vertical direction. In FIG. 20, the robot is shown in the state of not being installed inside the cell. In FIGS. 25 to 27, only one of two cables is shown. In FIG. 27, each member near the folding part of the cable is schematically shown.

A robot system 100 shown in FIG. 1 has a robot cell 50 including a cell 5 and a robot (industrial robot) 1 provided inside the cell 5. The robot 1 has a robot main body (main body part) 18 and a robot controller (control unit), not shown, for controlling the working of the robot main body 18 (robot 1).

The robot system 100 can be used, for example, in a manufacturing process for manufacturing a precision device such as a wristwatch. The robot 1 can, for example, carry out work such as feeding, removing, carrying and assembling the precision device and components forming the precision device.

The robot controller may be arranged inside the cell 5 or may be arranged outside the cell 5. If the robot controller is arranged inside the cell 5, the robot controller may be included inside the robot main body 18 (robot 1) or may be a separate unit from the robot main body 18.

Robot

As shown in FIGS. 20, 3 and 21, the robot main body 18 has a base (support part) 11 and a robot arm 6. The robot arm 6 includes a first arm (first arm member) (arm part) 12, a second arm (second arm member) (arm part) 13, a third arm (third arm member) (arm part) 14, a fourth arm (fourth arm member) (arm part) 15, a fifth arm (fifth arm member) (arm part) 16 and a sixth arm (sixth arm member) (arm part) 17

(six arms), and a first drive source (first drive unit) 401, a second drive source (second drive unit) 402, a third drive source (third drive unit) 403, a fourth drive source (fourth drive unit) 404, a fifth drive source (fifth drive unit) 405 and a sixth drive source (sixth drive unit) 406 (six drive sources). The fifth arm 16 and the sixth arm 17 form a wrist. At the distal end of the sixth arm 17, for example, an end effector such as a hand 91 can be removably attached.

As shown in FIGS. 20 and 21, the first arm 12 has a hollow part. The first arm 12 has a main body part 120 and cover parts 191, 192 removably provided on the main body part 120. In this case, an opening 129 is formed in a part 227 on the outer side of the first arm 12, and the cover part 192 is removably provided so as to cover the opening 129. Also, an opening 128 is formed in a part 226 on the inner side of the first arm 12, and the cover part 191 is removably provided so as to cover the opening 128. Thus, accessibility to the inside of the first arm 12 is improved and various kinds of work such as inspection, repair, and replacement can be easily carried out on each part such as the wire and the substrate arranged inside the first arm 12.

Although the cover part 191 covers the entirety of the opening 128, this is not limiting. The cover part 191 may cover a part of the opening 128. Similarly, though the cover part 192 covers the entirety of the opening 129, this is not limiting. The cover part 192 may cover a part of the opening 129.

Each of the cover parts 191, 192 may be made up of one member or may be made up of a plurality of members.

When the first arm 12 (first part of the first arm 12) and the second arm 13 overlap with each other, as viewed from the axial direction of a second rotation axis O2, the cover part 191 is situated between the main body part 120 and the second arm 13 (see FIG. 21). In this embodiment, the entirety of the cover part 191 is situated between the main body part 120 and the second arm 13. However, this is not limiting. A part of the cover part 191 may be situated between the main body part 120 and the second arm 13.

The first arm 12 is bent (has a bent shape). The term "bent" is a concept including both being bent sharply and being curved. In the case of being bent sharply, the corner may be pointed or round. The first arm 12 will be described below, referring to the state of FIG. 21.

The first arm 12 has: a first arm part 221 connected to the base 11 and extending downward in FIG. 21 in the axial direction of a first rotation axis O1 (vertical direction), described later, from the base 11; a second arm part 222 extending to the left in FIG. 21 in the axial direction of a second rotation axis O2 (horizontal direction), from the bottom end of the first arm part 221 in FIG. 21; a third arm part 223 provided at the end of the second arm part 222 opposite to the first arm part 221 and extending downward in FIG. 21 in the axial direction of the first rotation axis O1 (vertical direction); and a fourth arm part 224 extending to the right in FIG. 21 in the axial direction of the second rotation axis O2 (horizontal direction) from the end of the third arm part 223 opposite to the second arm part 222.

The first arm part 221, the second arm part 222, the third arm part 223 and the fourth arm part 224 are integrally formed. The second arm part 222 and the third arm part 223 are substantially orthogonal to (intersecting with) each other, as viewed from a direction (a direction perpendicular to the sheet in FIG. 21) orthogonal to both the first rotation axis O1 and the second rotation axis O2.

The second arm 13 has a longitudinal shape and is connected to a distal end part of the first arm 12, that is, the end of the fourth arm part 224 opposite to the third arm part 223.

As shown in FIGS. 3, 20 and 21, the base 11 and the first arm 12 are connected together via the joint 171. The joint 171 has a mechanism for supporting the first arm 12 connected to the base 11, rotatably in relation to the base 11. This enables the first arm 12 to rotate about the first rotation axis O1 (around the first rotation axis O1) parallel to the vertical direction, in relation to the base 11. The first rotation axis O1 coincides with a normal line to the ceiling surface 531 of the ceiling part 53 on which the base 11 is mounted. The first rotation axis O1 is a rotation axis situated on the most upstream side of the robot 1. The rotation around the first rotation axis O1 (driving of the first arm 12) is carried out by the driving of the first drive source 401, which has a motor (first motor) 401M and a decelerator (not shown) and is mounted (provided) on a first mounting surface 161 (see FIGS. 21 and 26) of the first arm 12 and a mounting surface of the base 11 or the like. The first drive source 401 is driven by the motor 401M and a cable 20 (see FIG. 26). The motor 401M is controlled by the robot controller via a motor driver 301 electrically connected to the motor 401M. The decelerator may be omitted.

The first arm 12 and the second arm 13 are connected together via a joint 172. The joint 172 has a mechanism for supporting one of the first arm 12 and the second arm 13 connected to each other, rotatably in relation to the other. This enables the second arm 13 to rotate about the second rotation axis O2 (around the second rotation axis O2) parallel to the horizontal direction, in relation to the first arm 12. The second rotation axis O2 is orthogonal to the first rotation axis O1. The rotation around the second rotation axis O2 (driving of the second arm 13) is carried out by the driving of the second drive source 402, which has a motor (second motor) 402M and a decelerator (not shown) and is mounted (provided) on amounting surface of the second arm 13 and a second mounting surface 162 of the first arm 12 (see FIGS. 21 and 26) or the like. The second drive source 402 is driven by the motor 402M and the cable 20 (see FIG. 26). The motor 402M is controlled by the robot controller via a motor driver 302 electrically connected to the motor 402M. The decelerator may be omitted.

As a brake (braking device) for braking the second arm 13, a brake (not shown) is provided near the axis part (output axis) of the motor 402M. This brake can prevent the axis part of the motor 402M from rotating and thus enables the attitude of the second arm 13 to be held.

The second arm 13 and the third arm 14 are connected together via a joint 173. The joint 173 has a mechanism for supporting one of the second arm 13 and the third arm 14 connected to each other, rotatably in relation to the other. This enables the third arm 14 to rotate about a third rotation axis O3 (around the third rotation axis O3) parallel to the horizontal direction, in relation to the second arm 13. The third rotation axis O3 is parallel to the second rotation axis O2. The rotation around the third rotation axis O3 (driving of the third arm 14) is carried out by the driving of the third drive source 403, which has a motor (third motor) 403M and a decelerator (not shown) and is mounted on a mounting surface of the third arm 14 and a mounting surface of the second arm 13 or the like. The third drive source 403 is driven by the motor 403M and the cable 20 (see FIG. 26). The motor 403M is controlled by the robot controller via a motor driver 303 electrically connected to the motor 403M. The decelerator may be omitted.

As a brake (braking device) for braking the third arm 14, a brake (not shown) is provided near the axis part (output axis) of the motor 403M. This brake can prevent the axis part of the motor 403M from rotating and thus enables the attitude of the third arm 14 to be held.

As a brake (braking device) for braking the fourth arm 15, a brake (not shown) is provided near the axis part (output axis) of the motor 404M. This brake can prevent the axis part of the motor 404M from rotating and thus enables the attitude of the fourth arm 15 to be held.

As a brake (braking device) for braking the fifth arm 16, a brake (not shown) is provided near the axis part (output axis) of the motor 405M. This brake can prevent the axis part of the motor 405M from rotating and thus enables the attitude of the fifth arm 16 to be held.

As a brake (braking device) for braking the sixth arm 17, a brake (not shown) is provided near the axis part (output axis) of the motor 406M. This brake can prevent the axis part of the motor 406M from rotating and thus enables the attitude of the sixth arm 17 to be held.

As shown in FIGS. 24 and 26, the robot 1 also has two cables 20 with a plurality of wires arranged inside, and a pipe (not shown). The wires may be, for example, electrical wires or the like. The pipe may be, for example, a tube (tubular member) through which a fluid such as air (gas) or water (liquid) flows. Each of the cables 20 and the pipe is arranged as described below. The arrangements of the cables 20 and the pipe are similar to each other and therefore one cable 20 is described below as a representative example.

As shown in FIG. 26, the cable 20 is arranged in the hollow part (inside) of the first arm 12, the hollow part (inside) of the second arm 13 and the hollow part (inside) of the third arm 14, that is, arranged in the state of being inserted through each of the hollow parts. The cable 20 has a folding part 21a arranged on the outer circumference of the motor 401M, a folding part 21b arranged on the outer circumference of the motor 402M, and a folding part 21c arranged on the outer circumference of the motor 403M. The configurations of the respective folding parts 21a, 21b, 21c and their vicinities are similar to one another and therefore the folding part 21b arranged on the outer circumference of the motor 402M is described below as a representative example.

As shown in FIG. 27, the folding part 21b is folded in the circumferential direction of the axis part (output axis) of the motor 402M on the outer circumference of the motor 402M and is thus U-shaped, that is, bent into a U-shape. One end part 211 of the folding part 21b is fixed, with a clamp 441, to the outer circumferential surface of a rotating member 43 of the decelerator which is rotatable in relation to the motor 402M. The other end part 212 is fixed to the outer circumferential surface of the motor 402M with a clamp 442. The rotating member 43 is fixed to the first arm 12. The motor 402M is fixed to the second arm 13.

When the motor 402M is driven and the second arm 13 rotates, the rotating member 43 rotates in relation to the motor 402M. In this case, the torsion in the folding part 21b is restrained and the folding part 21b undergoes bending deformation. Thus, the stress acting on the cable 20 is relaxed. That is, a large bend radius of the cable 20 can be secured at the folding part 21b, and the cable 20 can be restrained from being twisted or fractured when the second arm 13 rotates. Thus, damage to the cable 20 can be restrained and durability can be improved.

As shown in FIGS. 24 to 26, the cable 20 is arranged more toward the second arm 13 than the second mounting surface 162, on the first arm 12, and more toward the second arm 13 than a centerline (center axis) 12a parallel to the first rotation axis O1, of the third arm part 223.

Thus, the total width (length in the axial direction of the second rotation axis O2) W1 of the first arm 12 and the second arm 13 (see FIGS. 21 and 26) can be reduced and a reduction in size and weight of the robot 1 can be achieved.

The main body part 120 of the first arm 12 has a wall part 225 including the first mounting surface 161 and the second mounting surface 162. The wall part 225 extends from the inner side of the second arm part 222 to the outer side of the third arm part 223. Near an intermediate position in the wall part 225, a hole 1251 penetrating the wall part 225 is formed. That is, a hole part (regulating part) 1252 having the hole 1251 is provided on the wall part 225. The cable 20 is inserted through the hole 1251 of the hole part 1252. Thus, the above arrangement of the cable 20 can be achieved. Also, since the hole part 1252 contacts the cable 20, the cable 20 can be regulated more toward the second arm 13 than the second mounting surface 162 (centerline 12a).

A regulating plate 181 is provided in the hollow part of the third arm part 223 of the first arm 12. The regulating plate 181 is a flat plate and substantially orthogonal to (intersecting with) the first rotation axis O1. The cable 20 is arranged on the side opposite to the second arm 13, of the regulating plate 181, and is regulated in its position by the regulating plate 181.

Up to this point, the configuration of the robot 1 has been described.

Next, the relations between the first arm 12 to the sixth arm 17 will be described, with different expressions and from various perspectives. The third arm 14 to the sixth arm 17 are considered to be in a straightened state, that is, in their longest states. In other words, these arms are considered to be in the state where the fourth rotation axis O4 and the sixth rotation axis O6 coincide with each other or parallel to each other.

First, as shown in FIG. 22, the length L1 of the first arm 12 is set to be longer than the length L2 of the second arm 13.

Here, the length L1 of the first arm 12 is the distance between the second rotation axis O2 and a centerline 621 extending in a left-right direction in FIG. 22 of the bearing part 62 rotatably supporting the first arm 12, as viewed from the axial direction of the second rotation axis O2.

The length L2 of the second arm 13 is the distance between the second rotation axis O2 and the third rotation axis O3, as viewed from the axial direction of the second rotation axis O2.

Also, the first arm 12 and the second arm 13 are configured in such a way that the angle θ formed by the first arm 12 and the second arm 13 can be made 0 degrees, as viewed from the axial direction of the second rotation axis O2, as shown in FIG. 6. That is, the first arm 12 and the second arm 13 are configured in such a way as to be able to overlap with each other, as viewed from the axial direction of the second rotation axis O2. In this case, it suffices that at least a part (first part) of the first arm 12 and the second arm 13 can overlap with each other.

The second arm 13 is configured in such a way as not to interfere with the ceiling surface 531 of the ceiling part 53 where the base 11 is provided and the second arm part 222 of the first arm 12, when the angle θ is 0 degrees, that is, when the first arm 12 and the second arm 13 overlap with each other, as viewed from the axial direction of the second rotation axis O2. In the case where the proximal end surface of the base 11 is mounted on the ceiling surface 531, the second arm 13 is similarly configured in such a way as not to interfere with the ceiling surface 531 and the second arm part 222 of the first arm 12.

By rotating the second arm 13 without rotating the first arm. 12, it is possible to move the distal end of the second arm 13 to a position that is 180 degrees different around the first rotation axis O1, following the state where the angle θ is 0 degrees as viewed from the axial direction of the second rotation axis O2 (state where the first arm 12 and the second arm 13 overlap with each other) (see FIGS. 23A to 23E). That is, by rotating the second arm 13 without rotating the first arm 12, it is possible to move the distal end of the robot arm 6 (distal end of the sixth arm 17) from a first position shown in FIG. 23A to the state where the angle θ is 0 degrees, and then to a second position shown in FIG. 23E that is 180 degrees different around the first rotation axis O1 (see FIGS. 23A to 23E). The third arm 14 to the sixth arm 17 are each rotated according to need.

When the distal end of the second arm 13 is moved to a position that is 180 degrees different around the first rotation axis O1 (when the distal end of the robot arm 6 is moved from the first position to the second position), the distal end of the second arm 13 and the distal end of the robot arm 6 move on a straight line, as viewed from the axial direction of the first rotation axis O1.

The total length (maximum length) L3 of the third arm 14 to the sixth arm 17 is set to be longer than the length L2 of the second arm 13.

Thus, when the second arm 13 and the third arm 14 overlap with each other, as viewed from the axial direction of the second rotation axis O2, the distal end of the sixth arm 17 can be made to protrude from the second arm 13. Thus, the hand 91 can be prevented from interfering with the first arm 12 and the second arm 13.

Here, the total length (maximum length) L3 of the third arm 14 to the sixth arm 17 is the distance between the third rotation axis O3 and the distal end of the sixth arm 17, as viewed from the axial direction of the second rotation axis O2 (see FIG. 22). In this case, the third arm 14 to the sixth arm 17 are in the state where the fourth rotation axis O4 and the sixth rotation axis O6 coincide with each other or parallel to each other, as shown in FIG. 22.

As described above, in the robot system 100, by rotating the second arm 13 and the third arm 14 or the like without rotating the first arm 12, the robot 1 can move the hand 91 (distal end of the robot arm 6) to a position that is 180 degrees different around the first rotation axis O1, following the state where the angle θ formed by the first arm 12 and the second arm 13 is 0 degrees as viewed from the axial direction of the second rotation axis O2 (state where the first arm 12 and the second arm 13 overlap with each other). Therefore, the space to prevent interference of the robot 1 can be reduced. This enables miniaturization of the cell 5 and a reduction in the installation space for installing the robot system 100. Thus, for example, many robot systems 100 per unit length can be arranged along a production line, and the production line can be shortened.

Also, since the total width W1 of the first arm 12 and the second arm 13 can be reduced, a reduction in size and weight of the robot can be achieved.

An area (part) 101 surrounded by double-dotted chain lines on the right side of FIG. 21, of the third arm 14 and the fourth arm 15, is an area (part) where the robot 1 does not interfere or does not easily interfere with the robot 1 itself or other members. Therefore, when a predetermined member is installed in the area 101, the member does not easily interfere with the robot 1 and peripheral devices or the like.

Therefore, in the robot 1, a predetermined member can be installed in the area 101. Particularly, when the predetermined member is installed in the area on the right side of FIG. 21 of the third arm 14, of the area 101, the probability of the member interfering with peripheral devices (not shown) arranged on the work table 52 drops further, which is more effective.

The robot according to the invention has been described above on the basis of the illustrated embodiments. However, the invention is not limited to the embodiments. The configuration of each part can be replaced with an arbitrary configuration with similar functions. Also, another arbitrary configuration may be added.

In the embodiments, the site where the base of the robot is fixed is the ceiling part of the cell. However, the invention is not limited to this. The wall part of the cell, the work table, the floor part and the like may also be employed.

In the embodiments, the robot is installed inside the cell. However, the invention is not limited to this. For example, the cell may be omitted. In this case, the site where the base is fixed may be, for example, the ceiling, the wall, the work table, the floor, the ground or the like in the installation space.

In the embodiments, the first surface, which is the surface (plane) where the robot (base) is fixed, is a surface (plane) parallel to the horizontal plane. However, the invention is not limited to this. For example, a surface (plane) tilted in relation to a horizontal plane or a vertical plane may be employed, and a surface (plane) parallel to a vertical plane may be employed as well. That is, the first rotation axis may be tilted in relation to the vertical direction or the horizontal direction and may be parallel to the horizontal direction.

While the number of rotation axes in the robot arm in the embodiments is six, the invention is not limited to this. The number of rotation axes in the robot arm may be, for example, two, three, four, five, or seven or more. That is, while the number of arms (links) in the embodiments is six, the invention is not limited to this. The number of arms may be, for example, two, three, four, five, or seven or more. In this case, for example, in the robot in the embodiments, an arm may be added between the second arm and the third arm, thus achieving a robot in which the number of arms is seven.

While the number of robot arms in the embodiments is one, the invention is not limited to this. The number of robot arms may be, for example, two or more. That is, the robot (robot main body) may be, for example, a multi-arm robot such as a dual-arm robot.

According to the invention, the robot (robot main body) may be a different form of robot. As a specific example, a legged walking (running) robot having a leg part or the like may be employed.

In the embodiments, the surface of the part on the outer side of the intermediate part of the first arm is curved or extends in the third direction, as viewed in a direction orthogonal to both the first rotation axis O1 and the second rotation axis O2 (direction orthogonal to both the first direction and the second direction). However, the invention is not limited to this. The surface of the part on the outer side of the intermediate part of the first arm may include, for example, a right-angled corner part, as viewed from a direction orthogonal to both the first rotation axis O1 and the second rotation axis O2.

In the embodiments, the respective cables and the pipe are arranged as shown in FIGS. 24 to 27. However, the invention is not limited to this. For example, it is possible that only the cables (wires) are arranged as shown in FIGS. 24 to 27, or that only the pipe is arranged as shown in FIGS. 24 to 27.

The entire disclosure of Japanese Patent Application Nos. 2015-091213, filed Apr. 28, 2015 and 2015-091214, filed Apr. 28, 2015 are expressly incorporated by reference herein.

What is claimed is:

1. A robot comprising:
   a base;
   a first arm connected to the base rotatably about a first rotation axis;
   a second arm connected to the first arm rotatably about a second rotation axis that is a different axial direction from an axial direction of the first rotation axis, the second rotation axis being orthogonal to the first rotation axis when viewed from a direction orthogonal to both the first rotation axis and the second rotation axis;
   a third arm connected to the second arm rotatably about a third rotation axis, the third rotation axis being parallel to the second rotation axis;
   a fourth arm connected to the third arm rotatably about a fourth rotation axis, the fourth rotation axis being orthogonal to the third rotation axis when viewed from a direction orthogonal to both the third rotation axis and the fourth rotation axis;
   a fifth arm connected to the fourth arm rotatably about a fifth rotation axis, the fifth rotation axis being orthogonal to the fourth rotation axis when viewed from a direction orthogonal to both the fourth rotation axis and the fifth rotation axis; and
   a sixth arm connected to the fifth arm rotatably about a sixth rotation axis, the sixth rotation axis being orthogonal to the fifth rotation axis when viewed from a direction orthogonal to both the fifth rotation axis and the sixth rotation axis, wherein
   the first arm includes a first segment extending in a first direction and a second segment extending in a second direction different from the first direction, the first segment and the second segment being a single monolithic piece such that a position of the first segment relative to the second segment is fixed and the first segment and the second segment, together, rotate about the first rotation axis,
   the first arm is bent, and
   in a first position, the first arm, the second arm, and the third arm overlap with one another when viewed from an axial direction of the second rotation axis and the third arm is closer to the first rotation axis than the second arm.

2. The robot according to claim 1, wherein
   the first arm includes:
   a third segment situated between the first segment and the second segment and extending in a direction that is different from the first direction and the second direction.

3. The robot according to claim 1, wherein
   the first arm includes:
   a third segment situated between the first segment and the second segment and bent as viewed from a direction orthogonal to the first direction and the second direction.

4. The robot according to claim 2, further comprising:
   a first drive unit which drives the first arm and is mounted on a first mounting surface of the first arm and on the base; and
   a second drive unit which drives the second arm and is mounted on a second mounting surface of the first arm and on the second arm,
   wherein a maximum distance between a first straight line connecting a first point of intersection between the first rotation axis and the first mounting surface and a second point of intersection between the second rotation axis and the second mounting surface, and the third part, is shorter than a distance between the first straight line and a third point of intersection which is a point of intersection between a second straight line passing through the first point of intersection and extending in the first direction and a third straight line passing through the second point of intersection and extending in the second direction.

5. The robot according to claim 2, wherein
   a length of the second part in the axial direction of the second rotation axis is shorter than a length of the first part in the axial direction of the first rotation axis, as viewed from a direction orthogonal to the first direction and the second direction.

* * * * *